United States Patent
Kosuge et al.

(10) Patent No.: US 7,768,413 B2
(45) Date of Patent: *Aug. 3, 2010

(54) MONITORING SYSTEM AND METHOD

(75) Inventors: Roy Kosuge, Century City, CA (US); Pat Crane, Century City, CA (US); Alan Pittman, Oak Park, CA (US); John Maris, Century City, CA (US)

(73) Assignee: Aeromesh Corporation, Century City, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 11/944,329

(22) Filed: Nov. 21, 2007

(65) Prior Publication Data
US 2008/0155064 A1 Jun. 26, 2008

Related U.S. Application Data

(63) Continuation of application No. 11/426,006, filed on Jun. 22, 2006, now Pat. No. 7,626,508, which is a continuation-in-part of application No. 11/303,435, filed on Dec. 16, 2005, now Pat. No. 7,342,504, which is a continuation of application No. 10/091,852, filed on Mar. 5, 2002, now Pat. No. 7,002,481.

(51) Int. Cl.
*G08B 21/00* (2006.01)
(52) U.S. Cl. .................................................... 340/612
(58) Field of Classification Search ................ 340/612, 340/540, 606, 621, 539.16; 73/861
See application file for complete search history.

(56) References Cited

U.S. PATENT DOCUMENTS

| | | | | |
|---|---|---|---|---|
| 4,119,382 A | 10/1978 | George et al. | ............... | 356/249 |
| 4,799,388 A | 1/1989 | Hunter | ................... | 73/861.63 |
| 4,896,542 A | 1/1990 | Hunter | ................... | 73/861.63 |
| 5,111,201 A | 5/1992 | Matsumura et al. | .... | 340/870.38 |
| 5,199,306 A | 4/1993 | Hunter | ................... | 73/861.63 |
| 5,330,061 A | 7/1994 | Geitz | ...................... | 211/105.4 |
| 5,406,828 A | 4/1995 | Hunter et al. | ................... | 73/4 |

(Continued)

OTHER PUBLICATIONS

"The Telogers Enterprise System," webpage link for Telog Instruments, Inc., http://www.telog.com/flash/Enterprise_System_applications.htm, dated 2006.

(Continued)

*Primary Examiner*—Phung Nguyen
(74) *Attorney, Agent, or Firm*—Irell & Manella LLP

(57) ABSTRACT

A monitoring system includes one or more monitoring devices, positioned in sewer manholes, storm drains, etc., and a remote monitoring station that communicates wirelessly therewith. The monitoring device may be an integrated unit, including sensors, a two-way telemetry unit, a power supply, a processor, and supporting hardware, all located in an enclosed, waterproof housing. The monitoring device is placed within a manhole cavity to obtain depth (e.g., water level) measurements, images, and other data, and report the measurements back to the remote monitoring station, which analyzes the data and responds to alert messages when a dangerous water level is detected. An additional sensor may monitor the manhole cover for security purposes. A distributed mesh network of wireless nodes may be used to relay communications from the monitoring devices along alternative paths, through bridge nodes that may connect to a public wireless or cellular network.

21 Claims, 13 Drawing Sheets

U.S. PATENT DOCUMENTS

| | | | | |
|---|---|---|---|---|
| 5,423,226 | A | 6/1995 | Hunter et al. | 73/861.63 |
| 5,565,783 | A | 10/1996 | Lau et al. | 324/522 |
| 5,608,171 | A * | 3/1997 | Hunter et al. | 73/861.63 |
| RE35,503 | E | 5/1997 | Hunter | 73/861.63 |
| 5,684,250 | A | 11/1997 | Marsh et al. | 73/227 |
| 5,811,688 | A | 9/1998 | Marsh et al. | 73/861.25 |
| RE36,069 | E | 2/1999 | Hunter | 73/215 |
| 6,539,794 | B1 * | 4/2003 | Otto et al. | 73/290 V |
| 6,585,428 | B1 * | 7/2003 | Wesselink et al. | 396/427 |
| 7,423,985 | B1 * | 9/2008 | Hill | 370/310.1 |
| 2002/0041238 | A1 | 4/2002 | Johnson et al. | 340/870.28 |

OTHER PUBLICATIONS

Internet archive summary page for telog.com, http://web.archive.org/web/*/http://www.telog.com, printed Jan. 24, 2007.

"Welcome to Telog Instruments, Inc. Provider of Remote Data Acquisition Solutions," Oct. 27, 2000, http://web.archive.org/web/20001027104728/http://www.telog.com.

"Telog Products," Oct. 27, 2000, http://web.archive.org/web/20000919231955/www.telog.com/products.shtml.

"Telog R-3314 Teloger 14-channel Recorder for Remote Data Acquisition," Rev. 0898, Oct. 27, 2000.

"Telog R-3308 Teloger Eight-channel Recorder for Remote Data Acquisition," Oct. 27, 2000.

"Colorado Water Utility Saves Personnel, Maintenance Costs with Digital pressure Recorder," Oct. 27, 2000, reprinted from Water & Wastes Digest Magazine, Apr. 2000.

"Telog Data Acquisition Remote Wireless," http://web.archive.org/web/20011202155956/http://www.telog.com/, Dec. 2, 2001.

"Telog Gas Products," http://web.archive.org/web/20011031122217/www.telog.com/gas.htm, Dec. 2, 2001.

"HPR-21 Hydrant Pressure Recorder," http://web.archive.org/web/20011218224035/www.telog.com/Applications/hpr_21.htm, Dec. 2, 2001.

"HPR-21 Specification," http://web.archive.org/web/20020102173628/www.telog.com/hpr_21_specs.htm, Dec. 2, 2001.

"Telog's RS-33 Recording System for Remote Monitoring of Distribution System," Dec. 2, 2001.

"RS-33 Remote Monitoring System," http://web.archive.org/web20070124200102/http://www.telog.com/remote_monitoring.htm, Dec. 2, 2001.

"WLS-2109e Water Level Recorder," http://web.archive.org/web/20011031113133/www.telog.com/applications/wls_21.htm, Dec. 2, 2001.

"WLS-2109e Technical Specifications," http://web.archive.org/web/20020102190214/www.telog.com/wls_21_specs.htm, Dec. 2, 2001.

"CSO/SSO Monitoring," http://web.archive.org/web/20011126192020/www.telog.com/applications/wwd_3.htm, Dec. 2, 2001.

"Flow Monitors and Communications, Flow Monitoring Systems," webpage link for ADS Corporation, specifically http://www.adsenv.com/default.aspx?id=21, printed on Sep. 12, 2007.

Internet archive summary page for adsenv.com, http://web.archive.org/web/*/http://www.adsenv.com, printed Jan. 24, 2007.

"Welcome to ADS's Homepage!" http://web.archive.org/web/20001219092900/http://www.adsenv.com/index.html, Dec. 19, 2000.

"What We Do, The products, services, and capabilities we offer," http://web.archive.org/web/20001219183100/www.adsenv.com/what_we_do.html, Dec. 19, 2000.

"What We Do: Products," landscape version, http://web.archive.org/web/20010106110500/www.adsenv.com/what_we_do-products.html, Dec. 19, 2000.

"What We Do Products," portrait version, http://web.archive.org/web/20010106110500/www.adsenv.com/what_we_do-products.html, Dec. 19, 2000.

"Model 4000," http://web.archive.org/web/200101240757/www.adsenv.com/what_we_do-products_4000.html, Dec. 19, 2000.

"Profile™ Software, Profile the Performance of Your Collection System," http://web.archive.org/web/20010420171548/www.adsenv.com/what_we_do-products-prof.html, Dec. 19, 2000.

"Model 3500," http://web.archive.org/web/20010106114800/www.adsenv.com/what_we_do-products_3500.html, Dec. 19, 2000.

"Model 3600," http://web.archive.org/web/20010106120600/www.adsenv.com/what_we_do-products_3600.html, Dec. 19, 2000.

"Model 5600," http://web.archive.org/web/20010106121800/www.adsenv.com/what_we_do-products_5600.html, Dec. 19, 2000.

"Model 1500," http://web.archive.org/web/20010302080448/www.adsenv.com/what_we_do-products_1500.html, Dec. 19, 2000.

"Model 1600," http://web.archive.org/web/20010303013913/www.adsenv.com/what_we_do-products_1600_.html, Dec. 19, 2000.

"Rain Alert 3600," http://web.archive.org/web/20010106100700/www.adsenv.com/what_we_do-p-rainalrt_3600.html, Dec. 19, 2000.

"Master Series™, Infrastructure Management Software," http://web.archive.org/web/20010106103300/www.adsenv.com/what_we_do-products-mast.html, Dec. 19, 2000.

"Welcome to ORE Offshore," http://web.archive.org/web/20010301205753/www.ore.com, Dec. 19, 2000.

"SCADA Systems," http://web.archive.org/web/20010106101800/www.adsenv.com/what_we_do-products-SCADA.html, Dec. 19, 2000.

"What We Do: Services," http://web.archive.org/web/20001212212300/www.adsenv.com/what_we_do-services.html, Dec. 19, 2000.

"Flow Monitoring," http://web.archive.org/web/20001008100634/www.adsenv.com/what_we_do-services-flomon.html, Dec. 19, 2000.

"Welcome to ADS Corporation's Homepage," http://web.archive.org/web/20020122183413/http://www.adsenv.com, Jan. 22, 2002.

"ADS What We Do, The products, services, and capabilities we offer," http://web.archive.org/web/20020214224239/www.adsenv.com/what_we_do.htm, Jan. 22, 2002.

"ADS What We Do: Products," http://web.archive.org/web/20011122165419/www.adsenv.com/what_we_do-products.htm, Jan. 22, 2002.

"ADS Introduces IntelliScan?" http://web.archive.org/web/20020113194034/www.adsenv.com/what_we-doproducts_IntelliScanrel.htm, Jan. 22, 2002.

"ADS Model 4000 Open Channel," http://web.archive.org/web/20020917010215/adsenv.com/what_we_do-products_4000.htm, Jan. 22, 2002.

"ADS Model 3600," http://web..archive.org/web/20020917011001/adsenv.com/what_we_do-products_3600.htm, Jan. 22, 2002.

"ADS What We Do: Services," http://web.archive.org/web/20011226224643/www.adsenv.com/what_we_do-services.htm, Jan. 22, 2002.

"ADS Flow Monitoring," http://web.archive.org/web/20020618032830/www.adsenv.com/what_we_do-services.flomon.htm, Jan. 22, 2002.

"MOSCAD Wireless Monitoring and Control Solutions for the Water/Wastewater Industry," MotoMonitor, Motorola, Inc., 2005.

"System Integration and Design Inc., BOTAS Natural Gas Project," printed from http://www.sys-inc.com/projects/prj_bng.htm, 2001 SYS System Integration and Design Inc., Oct. 5, 2001.

"Water & Wastes Digest (WWD), Data Logger/SCADA Integration Saves Time for Field Crews, Permits Early Warning of Problems," *Water & Wastes Digest*, Feb. 2002, vol. 42 No. 2.

"Water & Wastes Digest (WWD), Making the Right Choices for Your Wireless SCADA System," *Water & Wastes Digest*, Feb. 2000.

"Ultrasonic Technology Simplifies Flow and Level Management," *Water Engineering & Management*, Dec. 1994.

"Utility Systems Science and Software, About Us," http://www.uscubed.com/usss/about.htm, printed on Sep. 12, 2007.

Product Family Overview, Stevens Water Monitoring System, website printout from www.stevenswater.com (Nov. 9, 2001).

Johnson, Dick, "Differential Flowmeters: Simple Can Be Better," Control Engineering Online, website printout from www.controleng.com (Sep. 2000), pp. 1-3.

"Liquid Flowmeters," Omega.com Technical Reference, website printout from www.omega.com/techref/flowcontrol.html, reprinted from Plant Engineering Magazine, Nov. 21, 1984, by Cahners Publishing Company.

* cited by examiner

MONITORING SYSTEM AND METHOD

RELATED APPLICATION INFORMATION

This application is a continuation of U.S. application Ser. No. 11/426,006 filed Jun. 22, 2006, which is a continuation-in-part of U.S. application Ser. No. 11/303,435 filed Dec. 16, 2005, which is a continuation of U.S. application Ser. No. 10/091,852 filed Mar. 5, 2002, now U.S. Pat. No. 7,002,481, all of which are hereby incorporated by reference as if set forth fully herein.

BACKGROUND OF THE INVENTION

1) Field of the Invention

The field of the present invention relates generally to monitoring devices and methods and, more particularly, to devices and methods for monitoring water depth and other aspects of sewers, storm drains, waterways, and the like.

2) Background

Most municipalities have a sanitary wastewater system, the purpose of which is to collect and transport waste matter from the various drains, disposals and other sources within the community to a sewage treatment plant or other such facility. Ideally, the waste matter is transported via the sanitary wastewater system without any spillage or leakage whatsoever. However, sanitary wastewater systems can be enormous in scale, making their management and maintenance extremely challenging tasks. Even in smaller municipalities, managing and maintaining the local sanitary wastewater system can be difficult. Problems often arise from the demands placed upon these systems, which may be found in widely varying states of repair. Such demands generally include severe weather conditions (such as heavy rains or freezing temperatures), accumulation of obstructive materials (e.g., grease, sediment, roots or other debris), and groundwater infiltration, to name a few. In addition, community growth, either industrial or residential, can lead to increased strain on an existing sanitary wastewater system. When the wastewater collection system becomes taxed beyond capacity, manhole overflows and/or backflow into residential areas may result.

The adverse conditions preceding an overflow (or other similar event) often exist over an extended period of time (usually several days or weeks), gradually worsen, and, if not detected and rectified, cause the inevitable result. During the time preceding such an overflow event, wastewater begins to accumulate in one or more localized areas within the collection system, until gradually the level of the wastewater becomes so high it breaches the nearest outlet—usually a manhole opening—or else backs upstream where further problems can be caused.

A sewer overflow can pose significant health hazards within a local community. The cleanup operation can be costly, and an overflow can bring about an interruption in sewer service. Also, a sewer overflow can harm the local environment, and result in potential state and/or federal penalties.

To reduce the likelihood of overflow and backflow events, it has been common practice to place flowmeters at various points within the wastewater collection system, thereby allowing the liquid flow within the system to be monitored. Often the flowmeters are placed at locations where access is convenient, such as in sewer manholes.

A variety of different flowmeters have been developed, a number of which have been used or proposed for use in a wastewater monitoring system. One common class of flowmeters has a "primary" element and a "secondary" element. The primary element is a restriction in a flow line that induces a differential pressure and/or level, and the secondary element measures the differential pressure and/or level, converts the measurements into a flow rate, and records the flow rate data. Weirs and flumes are some of the oldest and most common devices used as flowmeter primary elements. More recently, flowmeters have been developed which use ultrasonic pulses to measure the liquid level, which is then converted into a flow rate.

A variety of drawbacks exist with conventional flowmeter monitoring systems. First, many flowmeter installations are configured to provide manual reading of the flow data that has been acquired over time. Reading the flow meter data can be a burdensome task. Generally, a field worker is required to travel to the physical location of the manhole, pry off the manhole cover, descend into the manhole, and attempt to collect the data from the secondary element of the installed flowmeter. Where numerous flowmeters are installed throughout a large municipal wastewater collection system, the task of collecting flow data from all of the flow meters can be a time-consuming, labor intensive (and therefore expensive) process. In situations of sudden rainfall events or other circumstances, it can be very difficult for field workers to monitor all of the flowmeters in the system, and a risk of overflow increases.

In addition to the difficulty in obtaining flow data from flowmeters installed in a wastewater collection system, flowmeters can also be expensive, and often require a high level of accuracy that can be difficult to maintain over time. Inaccurate liquid flow measurements in the context of a wastewater collection system can lead to serious or even disastrous results. Flowmeters may also require periodic inspection and cleaning, and can therefore be relatively expensive to maintain.

Various types of sewer monitoring systems have been developed or proposed to alleviate the need for manual data collection. One example is illustrated in U.S. Pat. No. 5,608, 171 to Hunter et al. However, available sewer monitoring systems of the wireless variety generally require devices that are expensive or require expensive components, can be difficult to install or remove, and/or have limited functionality or compatibility with other equipment.

It would therefore be advantageous to provide an improved technique for monitoring sewers, storm drains, waterways, and other such areas, to prevent overflows, facilitate maintenance, and improve information available for municipal planning purposes.

SUMMARY OF THE INVENTION

The invention in one aspect is generally directed to systems and methods for monitoring water depth and other conditions of sewers, storm drains, waterways, and other such areas.

In one aspect, a monitoring device is placed within a manhole or other suitable location for monitoring the buildup of water, sediment or other materials. The monitoring device preferably has a moisture-proof housing made of a non-corrosive, water-resistant material, and includes internal electrical circuitry (microprocessor, memory, etc.) for controlling the functions of the device. A sensor is oriented downward to obtain depth measurements at periodic intervals, and the measurements are stored in the device until readout at a later time. At certain intervals, the stored measurements are transmitted wirelessly to a remote monitoring station for evaluation and analysis.

In a preferred embodiment, the sample rate of the depth sensor and the frequency of reporting to the remote monitoring station are adjustable through commands downloaded wirelessly from the remote monitoring station. The monitoring device may also have internal alert modes which are entered when the monitored water level passes specific threshold values. Entry into a higher alert state may result in an increase in sampling and/or reporting rates.

In one embodiment, the monitoring device has a housing with multiple legs extending outwardly, for allowing the device to be mounted to the interior walls of a manhole. The legs can be made of a flexible, bendable, or compressible material, or else can be adjusted in size by way of a rotatable screw member or a telescoping member. In another embodiment, the monitoring device has a cylindrical housing with a slightly wider cap or head, adapted for, e.g., drop-down insertion into a hole in a manhole cover.

In various embodiments, additional external monitoring instruments may be deployed in the manhole or other location where the monitoring device is situated, and connected to ports in the monitoring device, which transmits data received from the external monitoring instruments to the remote monitoring station. Also, the monitoring device may include a second sensor, oriented upwards instead of downwards, to monitor disturbances to the manhole cover for security purposes.

A monitoring device as described herein may be used in the context of a preferred monitoring system, wherein a plurality of the monitoring devices are positioned within different manholes or other locations over a geographic region, for monitoring water level or other conditions within the various manholes or other locations. In such a system, the remote monitoring station communicates wirelessly with the monitoring devices and receives depth measurements at periodic intervals for processing and analysis. The sampling frequency and reporting frequency of the monitoring devices are preferably programmably adjustable, individually for each of the monitoring devices, through wireless commands transmitted from the remote monitoring station to the various monitoring devices. The wireless communications may be facilitated using a distributed mesh network of wireless nodes which provide for alternative communication paths from the various monitoring devices to the remote monitoring station via one or more bridge nodes, which may be wireless in nature and may utilize a public wireless or cellular network.

Further embodiments, variations and enhancements are also disclosed herein.

BRIEF DESCRIPTION OF THE DRAWINGS

FIG. 6A shows an oblique view of the monitoring device with an antenna piece inserted in a manhole cover, while FIG. 6B shows a cross-sectional view thereof.

DETAILED DESCRIPTION OF PREFERRED EMBODIMENTS

Figure 1:
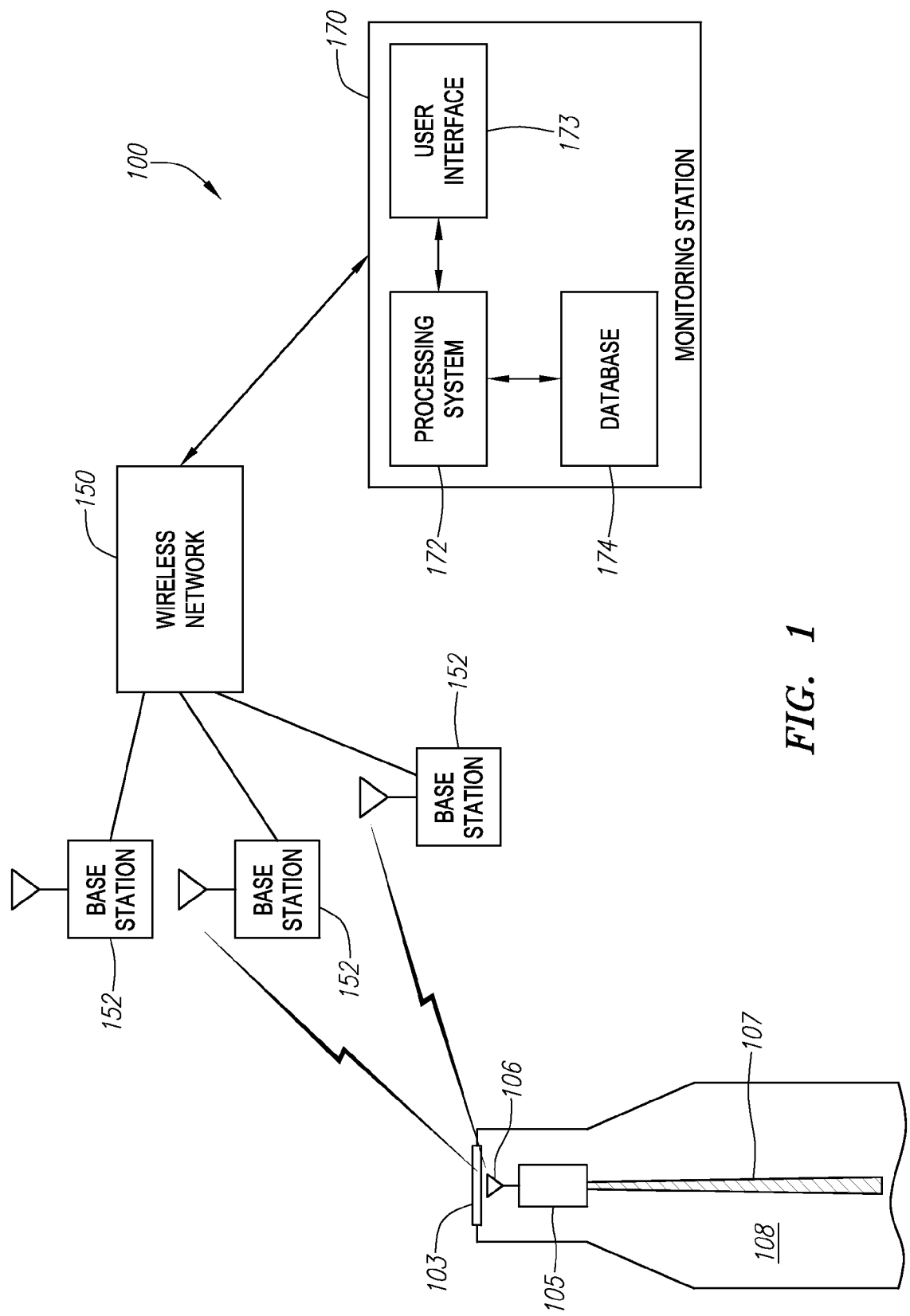
FIG. 1 is a block diagram of a monitoring system according to a preferred embodiment as disclosed herein.

FIG. 1 is a block diagram of a monitoring system 100 according to a preferred embodiment as disclosed herein. As illustrated in FIG. 1, the monitoring system 100 comprises a monitoring device 105 that can be positioned in a location for monitoring a depth (e.g., water level), such as in a manhole 108, or else in a storm drain or another suitable location. In a preferred embodiment, the monitoring device 105 manages one or more data sensors and provides timing, control, data and programming storage, and wireless communication functions to allow remote monitoring of the activity and operation of the monitoring device 105.

As further illustrated in FIG. 1, the monitoring device 105 preferably includes an antenna 106 for communicating wirelessly with remote stations. In the example shown in FIG. 1, the monitoring device 105 communicates with a remote monitoring station 170 through a wireless network 150, which can be a cellular network or any other type of wireless network. The wireless network 150 typically includes or is connected to a plurality of base stations 152 for communicating with various fixed or mobile wireless devices, such as the monitoring device 105.

While only one monitoring device 105 is shown in FIG. 1, it is to be understood that the monitoring system 100 can, and is likely to, include a significant number of monitoring devices identical or similar monitoring device 105, in order to monitor various manholes, sewer pipes, and/or other water or runoff conduits in a local vicinity or municipality. Likewise, while only a single remote monitoring station 170 is illustrated, additional remote monitoring stations may be included in the monitoring system 100, depending upon the size and scope of the overall system 100. Thus, while the principles of operation may be explained with respect to a single monitoring device 105 and remote monitoring station 170, they may be extrapolated to any number of monitoring devices and remote monitoring stations in a given system. In addition, one or more of the monitoring devices may utilize a wired connection with the remote monitoring station 170 rather than a wireless connection, particularly where the monitoring system 100 is deployed in an area having some manholes or other locations outfitted with pre-existing wirelines.

In the example of FIG. 1, the remote monitoring station 170 includes a processing system 172 which may comprise, for example, one or more computers or processors for receiving data from the monitoring device (or devices) 105, processing the data, and transmitting commands or other information back to the monitoring device (or devices) 1-5. The remote monitoring station 170 may include a database 174, local or remotely located, for storing data received from the monitoring device (or devices) 105. A user interface 173 allows operators or administrators to review the stored data or interactively adjust the operational parameters of the monitoring device (or devices) 105. In certain implementations, the remote monitoring station 170 may process incoming data from the monitoring devices 105 and relay the data, using any conventional means (such as electronic mail), to another site for storage or evaluation.

Figure 3:
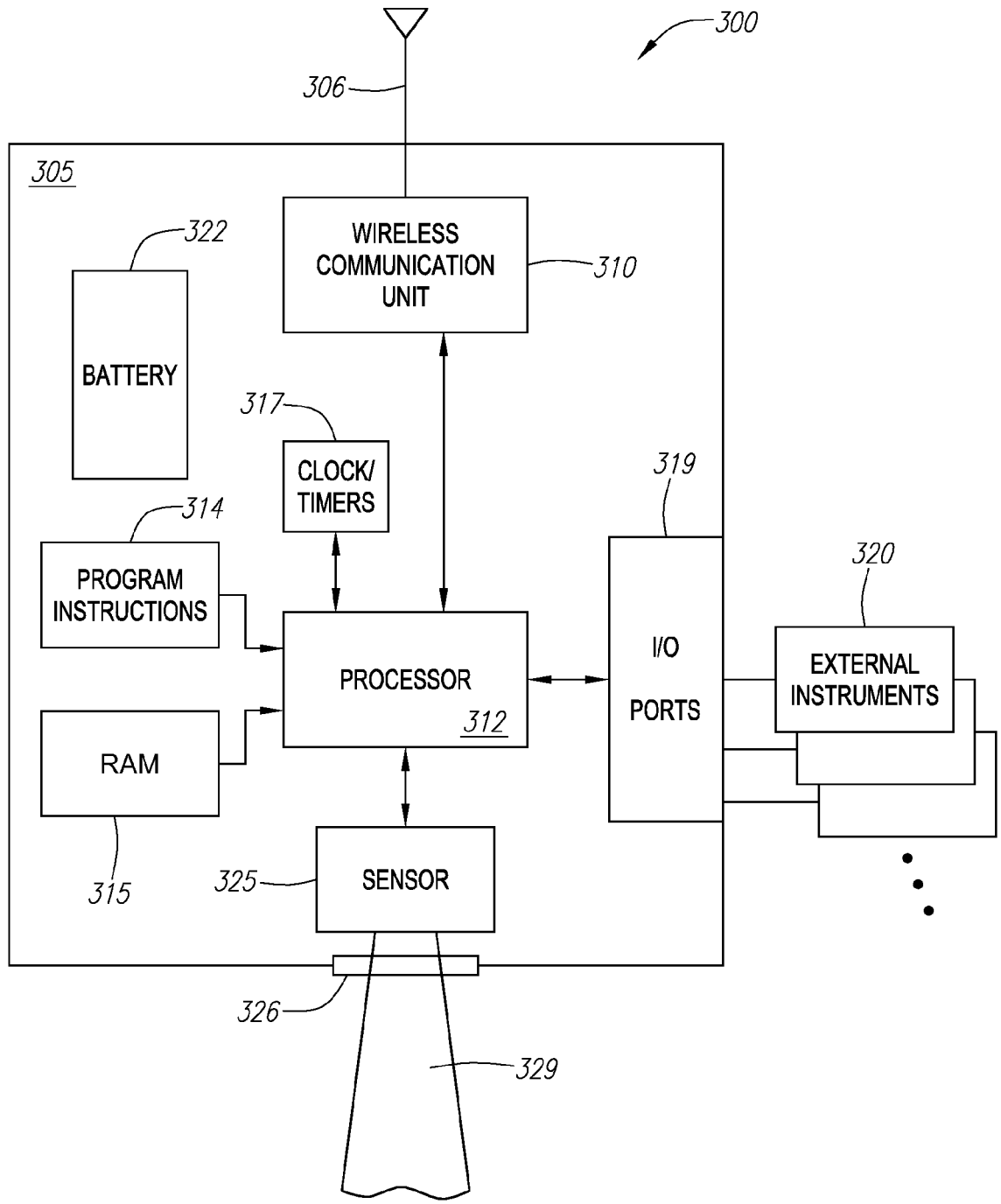
FIG. 3 is a block diagram of a preferred monitoring device.

Operation of the monitoring system 100 shown in FIG. 1 may be explained with reference to a preferred monitoring device 105, details of which, according to one example, are illustrated in FIG. 3. As shown in FIG. 3, a preferred monitoring device 300 includes housing 305 which is preferably formed of a water-resistant, non-corrosive lightweight material, such as plastic, fiberglass, or treated/sealed thin metal (e.g., aluminum). The housing 305 is preferably sealed so as to be effectively watertight, although a swinging panel or access door (not shown) may be provided to allow replacement of the battery 322 or possibly other components. The monitoring device 300 preferably comprises a wireless communication unit 310 which is attached to an antenna 306, for carrying out wireless communication with a wireless network (such as network 150 shown in FIG. 1). The wireless communication unit 310 preferably comprises at least a wireless transmitter but may also include a wireless receiver as well (or else be embodied as a wireless transceiver).

The monitoring device 300 preferably includes a processor 312 (which may comprise, e.g., a microprocessor, microcomputer, or digital circuitry) for controlling the basic functions of the monitoring device 300, including, for example, instructions to transmit data via the wireless communication unit 310, or interpretation of data received via the wireless communication unit 310. The processor 312 preferably includes (or is connected to) a non-volatile memory portion 314 for storing programming instructions for execution by the processor 312 and other data, and a volatile memory portion (e.g., random-access memory or RAM) 315 for storing programmable operation parameters, and for storing depth (e.g., water level) measurements as needed.

The processor 312 may be connected to various clocks and/or timers 317 for carrying out timing of certain events (e.g., timing of intervals between samples or data transmissions), and may be connected to a sensor 325 for measuring depth (e.g., water level). The sensor 325 is preferably capable of taking distance measurements in conditions of very low light as may be experienced when the device is installed in a manhole. The sensor 325 may, for example, be embodied as an ultrasonic sensor which uses the time delay of echoed sound waves to detect the distance from the sensor 325 to the nearest solid object (e.g., water surface). The sensor 325 may also, for example, utilize an electrostatic transducer for ultrasonic detection. Ultrasonic sensors utilizing electrostatic transducers are known in the art and are manufactured, for example, by SensComp, Inc. of Livornia, Mich., and others. An electrostatic transducer may be well suited for detecting soft objects and ranging to targets at both near and far distances. The sensor 325 may have a sensor window 326 affixed to the housing 305 of the monitoring device 300, for providing a viewpath 329 (illustrated as 107 in FIG. 1) for the sensor 325.

The monitoring device 300 preferably draws operating energy from an in-unit, low-voltage battery 322, which supplies energy to the processor 312, sensor 325, wireless communication unit 310, and any other components as necessary. As indicated elsewhere herein, the sensor sampling rate and data transmission rate of the monitoring device 300 are preferably kept to a minimum to prolong the life of the battery 322 as much as possible.

The monitoring device 300 may include one or more input/output (I/O) ports 319, to which can optionally be connected to various peripheral monitoring devices or instruments 320. Examples of peripheral monitoring devices include, for example, external flowmeters, heavy metal detectors, toxic gas detectors, and any other type of useful monitoring device. A peripheral monitoring device may also comprise a so-called "lab-on-a-chip," in other words, a microchip consisting of, e.g., interconnected fluid reservoirs and pathways that effectively duplicate the function of valves and pumps capable of performing manipulations such as reagent dispensing and mixing, incubation/reaction, sample partition, and analyte detection. The processor 312 may be configured to receive input signals, via the I/O ports 319, from the various peripheral monitoring devices 320, and to process the input signals, store the input signals in volatile memory 315, and/or convey the input signals, via the wireless communication unit 310, to the remote monitoring station. The monitoring device 300 may identify the various peripheral monitoring devices 320 by their particular I/O port number, by an equipment identification number or type number, or by any other suitable means, so that the remote monitoring station can interpret the source of readings or other information received from the monitoring device 300.

When not active, the various components of the monitoring device 300 are preferably rendered inactive by, e.g., placing them in a "sleep" state wherein no or minimal power is consumed. For example, the sensor 325, processor 312, and wireless communication unit 310, and possibly other components, may all be placed in an inactive state when no activity is necessary, and awakened upon the occurrence of an event needing attention (for example, the timeout of a sampling or reporting interval in a timer). At that point, power may be re-connected to the inactive components as necessary. Operation in this manner may significantly preserve battery life.

In operation, the monitoring device 300 takes periodic measurements of depth (e.g., water level) using the sensor 325, and stores the depth measurements in either the non-volatile memory 314 or the volatile memory (e.g., RAM) 315. The non-volatile memory 314 may be comprised of, e.g., flash memory for durably storing data, although the data may be rewritten or erased at a later point in time. Preferably, the sample period of the sensor 325 is programmable or adjustable, so that the sample period can be varied according to circumstances. The stored depth measurements, or a subset of stored depth measurements, can be subsequently read out from the non-volatile memory 314 or volatile memory 315, as the case may be, and transmitted, via the wireless communication unit 310, to the remote monitoring station 170. The monitoring device 300 can also periodically report its battery level to the remote monitoring station 170.

In a preferred embodiment, the time interval(s) between samples taken by the sensor 325 and the time interval(s) between data transmission from the monitoring device 300 to the remote monitoring station 170 are programmed through commands transmitted from the remote monitoring station 170 to the monitoring device 300. The time intervals are preferably stored, along with other operating parameters, in either the non-volatile memory 314 or volatile memory 315 of the monitoring device 300. Re-programming can be initiated in any of a variety of ways. For example, the remote monitoring station 170 may transmit a re-programming command to the monitoring device 300, followed by an identification of parameters to be altered, followed by the new parameter values. The particular format and protocol of the re-programming operation depends upon the communication technique employed. The remote monitoring station 170 may also re-program, through wireless commands transmitted to the monitoring device 170, parameters relating to any peripheral monitoring devices, such as the time interval(s) between transmitting data from the peripheral monitoring devices to the remote monitoring station 170. In one embodiment, the monitoring device 300 is configured to pass through re-programming instructions to a specified peripheral monitoring device that can itself be remotely re-programmed.

The monitoring device 300 may also be configured to automatically adjust the sample rate of water measurements obtained from the sensor 325 without intervention needed by the remote monitoring station 170. In this embodiment, the monitoring device 300 is programmed with a number of different alert levels, each of which corresponds to a specified (optionally programmable) sensor sample rate and/or data transmission rate. As an example, the monitoring device 300 could be configured with a normal operating mode, a low alert operating mode, and a high alert operating mode. The particular operating mode can be dictated by the detected water level. The monitoring device 300 may ordinarily operate in the normal operating mode, wherein it may sample the depth (e.g., water level) at a first rate (e.g., every 60 minutes). If the water level exceeds a low alert threshold, then the monitoring device 300 transitions to a low alert operating mode, and increases sampling frequency to a second rate (e.g., every 20 minutes). When entering the low alert operating mode, the monitoring device 300 may optionally transmit a message to that effect to the remote monitoring station 170. If the water level then rises to an extent that it exceeds a high alert threshold, the monitoring device 300 transitions to a high alert operating mode, and increases sampling frequency to a third rate (e.g., every 10 minutes). When entering the high alert operating mode, the monitoring device may optionally transmit a message to that effect to the remote monitoring station 170.

The low alert threshold and high alert threshold may be pre-programmed, or may be programmed or re-programmed after installation of the monitoring device 300. The low alert and high alert thresholds may be based in part on data collected during the initial period of installation of the monitoring device 300.

The frequency with which data is transmitted from the monitoring device 300 to the remote monitoring station 170 may also be varied depending upon the operating mode. For example, in the normal operating mode, the monitoring device 300 may be programmed or configured to transmit data at a first rate (e.g., once/week) to the remote operating station 170. In the low alert operating mode, the monitoring device 300 may be programmed to transmit data at a second rate (e.g., once/day). In the high alert operating mode, the monitoring device 300 may be programmed to transmit data at a third rate (e.g., once/hour).

The above sampling and broadcast rates are merely exemplary and are not intended to be limiting in any way. The actual sampling and broadcast rates may be selected based upon a number of factors, including the desired level of scrutiny for the particular manhole, the amount of available memory storage space to hold depth (e.g., water level) readings, and the need to preserve battery life to the maximum extent possible. Likewise, the monitoring device 300 may have more or fewer operating modes, depending upon the particular needs of the monitoring system 100.

In addition to automatic transitioning between operating modes, the monitoring device 300 may also be forced to transition between operating modes by commands received from the remote monitoring station 170, or may be programmed with override values for the sensor sampling interval and reporting interval (as well as the low and high alert threshold values). Alternatively, or in addition, the monitoring device 300, including its operating modes, can be programmable via one of the I/O ports 319. A benefit of remote programming of the sample and reporting intervals is that the monitoring device 300 may be manually set to more frequent sampling or reporting rates during certain times such as periods of bad weather (because of, e.g., possible rainwater infiltration) or local construction (which may cause obstructions, breaks, or leakages).

In a preferred embodiment, when reporting to the remote monitoring station 170 in the normal course of operation, the monitoring device 300 transmits a unique device identifier followed by the stored depth (e.g., water level) measurements. The monitoring device 300 may also record timestamp data relating to the depth measurements as the readings are taken, and transmit this information along with the stored depth measurements to the remote monitoring station 170. At the same time, or at other reporting intervals, the monitoring device 300 may also transmit data from any peripheral monitoring devices connected to it. When a water level reading exceeds an alert level (low or high), the monitoring device 300 preferably transmits immediately to the remote monitoring station 170 the device identifier, water measurement reading value, and an alarm code indicating the nature of the alert. At the same time, as noted above, the monitoring device 300 preferably enters an alert mode wherein it takes more frequent water level readings and/or reports to the remote monitoring station 170 more frequently.

The remote monitoring station 170 preferably processes the data received from all of the monitoring devices 105 and centrally manages the overall operation of the monitoring system 100. As previously indicated, the remote monitoring station 170 may transmit new operating parameters (including mode selections) to the various monitoring devices 105. The new operating parameters may, for example, by manually selected or entered by an administrator or operator via the user interface 173 at the remote monitoring station 170. Upon receiving an alert or alarm message from any of the monitoring devices 105, the processing system 172 may signal an operator or administrator by, e.g., activating a display light or audible alarm, and/or sending an electronic message (e.g., by e-mail or pager) or electronic facsimile communication to appropriate personnel. Historical data from the monitoring devices 105 may be stored in the database 174 and analyzed for whatever desired purpose—e.g., hazard evaluation, growth planning, etc. The database 174 may also correlate each device's unique identifier with its location, customer billing information (if applicable), and emergency handling procedure.

When an alert or alarm message is received by the remote monitoring station 170, the processing system 172 or a manual operator may attempt to confirm the existence of a hazardous situation, or evaluate a possible cause thereof, by comparing the water level readings of the monitoring device 105 sending the alert or alarm with the readings received from other monitoring devices 105 along the same pipeline (upstream or downstream). If those monitoring devices 105 are not yet at their typical reporting period, the remote monitoring station 170, automatically or under manual control, can issue commands to the other monitoring devices 105 to send their current water level readings to the remote monitoring station 170 for evaluation.

The remote monitoring station 170 may communicate with the various monitoring devices 105 according to any available and suitable wireless communication technique. Preferably, the wireless communication equipment on the monitoring device 105 and the wireless communication technique are selected so as to provide adequate penetration through the sewer manhole cover 103, to allow proper monitoring of and communication with the installed monitoring device 105. In a particular embodiment, the monitoring device 105 communicates with the remote monitoring station 170 using a suitable two-way pager communication protocol, such as, for example, the Wireless Communications Transport Protocol (WCTP), which offers mechanisms for passing alphanumeric and binary messages. Two-way pager communication may be carried out over the ReFLEX™ network, which provides widespread geographical coverage of the United States, or any other available network. Communicating through a two-way pager network may have the advantage of being less costly than, e.g., communicating over a wireless cellular network.

In alternative embodiments, the monitoring devices 105 may communicate with the remote monitoring station 170 through other types of wireless networks, such as a cellular, PCS, or GSM wireless network, or through any other type of wireless network. Communication may be conducted through base stations 152 (as illustrated in FIG. 1), and/or via communication satellites, and/or through wireless repeaters or relay stations. In remote locations, for example, where a monitoring device 105 may not be near a wireless base station 152, a wireless repeater may be positioned above ground near the manhole 108, to provide an intermediary link between the monitoring device 105 and the wireless network 150.

In some embodiments, messages transmitted wirelessly between the monitoring device 105 and the remote monitoring station 170 are formatted or exchanged according to a standard Internet protocol, such as, for example, the Simple Mail Transport Protocol (SMTP), HyperText Transfer Protocol (HTTP), or Transmission Control Protocol/Internet Protocol (TCP/IP). Scaled-down versions of these protocols may be utilized where certain functionality is not necessary for the purposes of the monitoring system 100.

Figure 2:
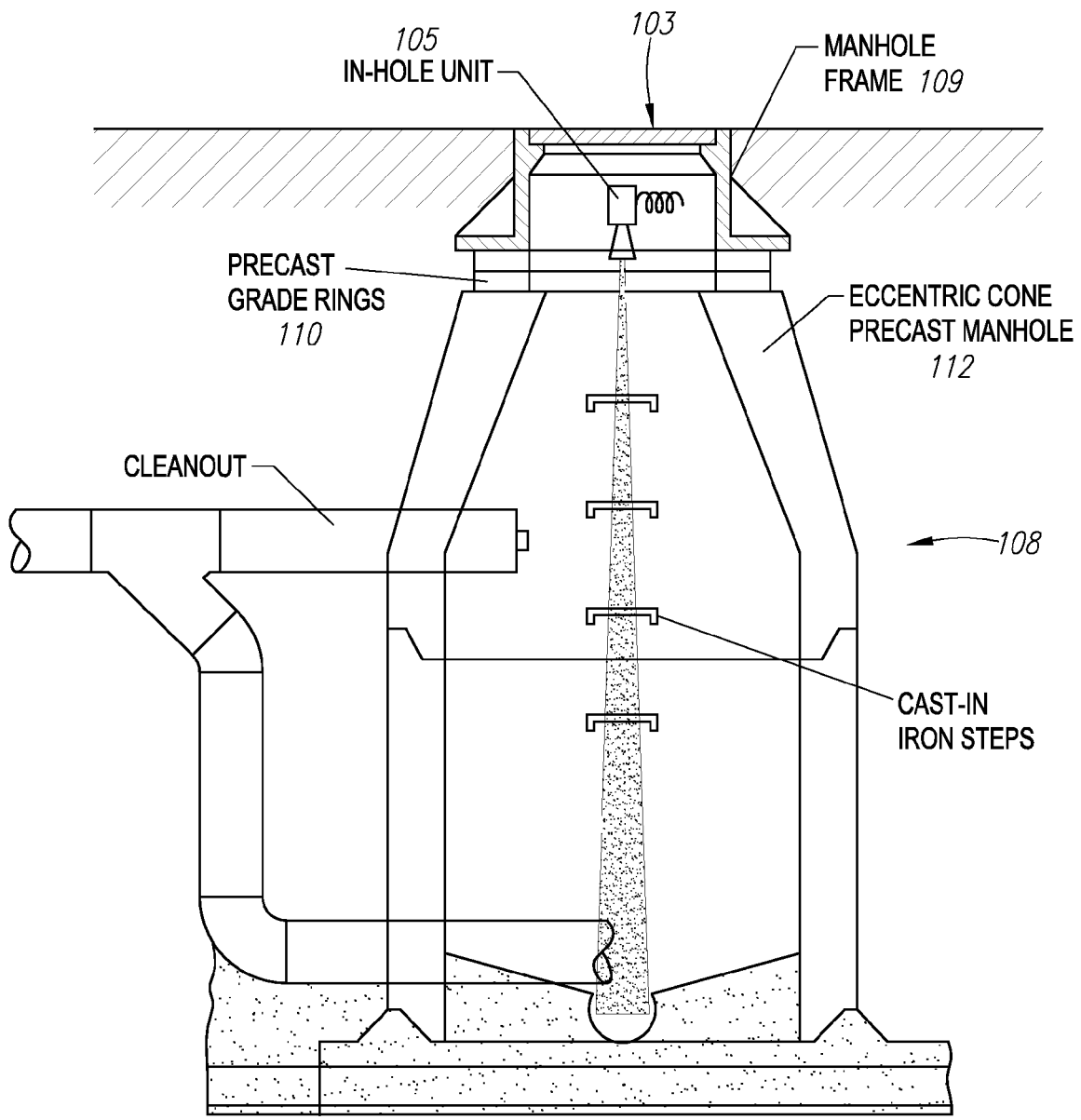
FIG. 2 is a diagram illustrating the positioning of a monitoring device in a manhole.

Various features of a preferred monitoring device relate to means for securing the monitoring device to the interior of a manhole cavity. FIG. 2, for example, illustrates in somewhat greater detail the positioning of a monitoring device 105 in a manhole 108. As shown in FIG. 2, a manhole 108 may have a manhole frame 109 abutting the ground surface, with a manhole cover 103 for providing access to the manhole cavity. The manhole 108 may include a pre-cast cone-shaped housing 112, typically formed of concrete or a similar durable and relatively inexpensive material. One or more precast rings 110 may be interposed between the manhole frame 109 and the cone-shaped manhole housing 112. Preferably, the monitoring device 105 is mounted near the top of the manhole 108, within the area of the manhole frame 109 (if provided).

Figure 4A:
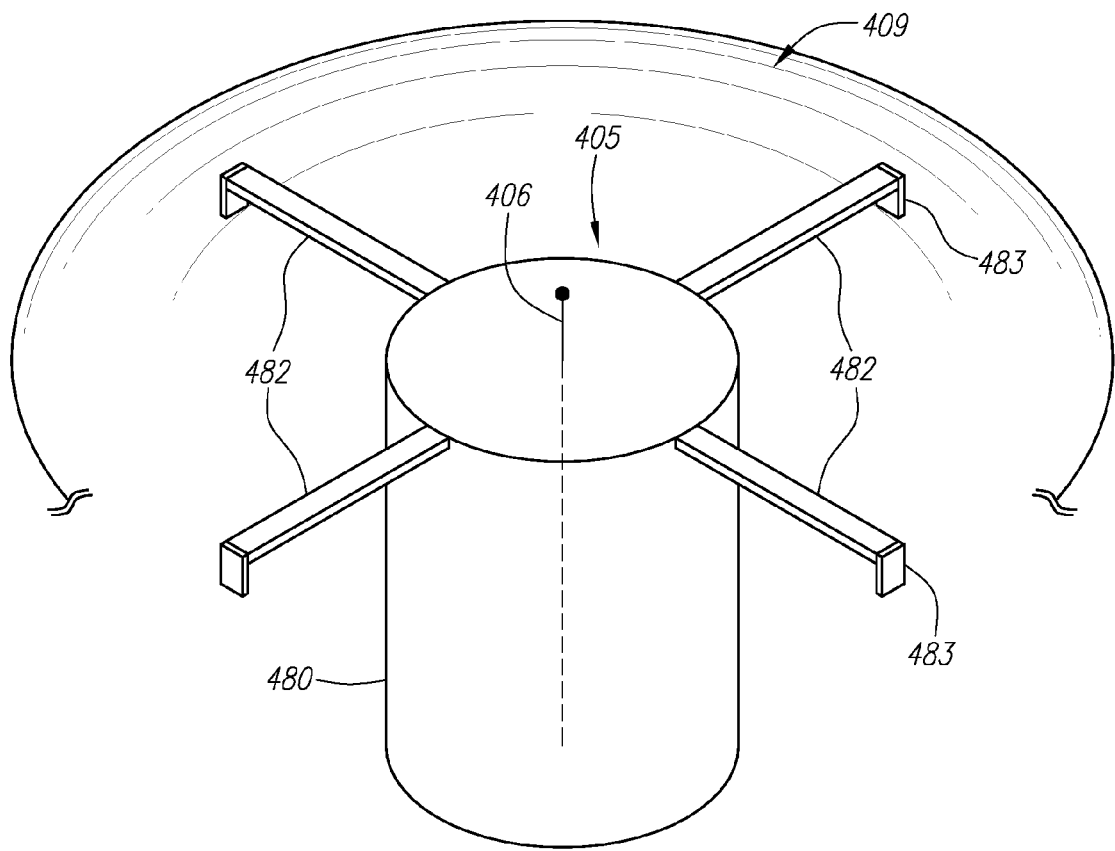
FIG. 4A is a diagram illustrating a monitoring device including legs for mounting within a manhole.
Figure 4B:
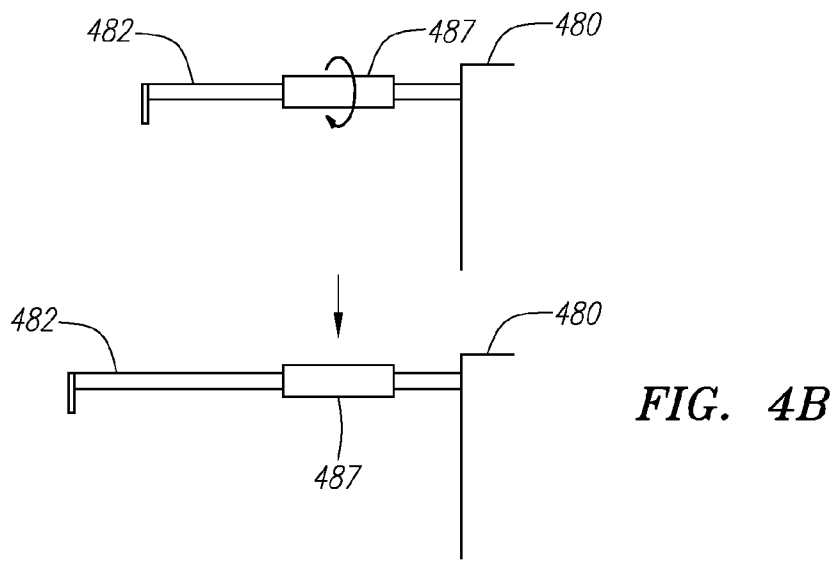
FIG. 4B is a diagram illustrating a rotatable member for adjusting the length of a leg for securing a monitoring device within a manhole cavity.

To facilitate rapid installation and removal of the monitoring device 105, the monitoring device 105 is preferably suspended in the manhole by multiple legs which emanate from the housing of the monitoring device 105. FIG. 4A is a diagram illustrating a monitoring device 405 including legs 482 for mounting within a manhole frame 409. The internal functional features of the monitoring device 405 shown in FIG. 4A may conform, for example, to those shown in FIG. 3 or FIG. 5. As illustrated in FIG. 4A, a set of legs 482 emanate from the housing 480 (depicted in a cylindrical shape) of the monitoring device 405, effectively suspending the monitoring device 405 at the top of the manhole cavity. The legs 482 may be formed, in whole or part, of a pliable, flexible or compressible material, to allow the legs to adapt to the particular width across the manhole frame 409 (or the top of the manhole cavity, if no manhole frame is present). Alternatively, the legs 482 may have a rotatable screw member 487 for allowing adjustment of leg length, as illustrated in FIG. 4B, or a telescoping leg member. The legs 482 may be terminated in feet 483 which are preferably surfaced with an adhesive or gripping material to allow the legs to firmly grasp the inner surface of the manhole frame 409.

The number of legs 482 used to secure the monitoring device 405 to the interior of the manhole may vary depending upon a number of factors. Generally, three or four legs 482 should be sufficient to secure the monitoring device 405. However, even a single leg can be used, if one side of the housing 480 is in contact with the interior surface of the manhole frame 409. In such an embodiment, the contacting side of the device housing 480 may be surfaced with a gripping material such as soft rubber or foam, for example. From a composition standpoint, it may be desirable to manufacture the legs 482 from a non-metallic material, to avoid possible interference with wireless transmission or reception by the monitoring device 405.

Installation of the monitoring device 405 shown in FIG. 4A may be conducted as follows. First, workers may remove or tilt open the manhole cover, and then lower the monitoring device 405 into the manhole cavity. The monitoring device 405 may be tethered when lowering and installing it (or removing it), to prevent it from dropping to the bottom of the manhole cavity should it slip. Since the total span of a pair of legs 482 may exceed the width of the manhole opening, the workers may need to bend or flex one or more legs 482, or, if having a rotatable screw or telescoping member, retract one or more legs 482 when passing the monitoring device 405 through the manhole opening. Once inside the manhole frame 409 (or top of the manhole cavity), the legs may be released or extended and pressed against the inner surface of the manhole frame 409. The gripping feet 483 at the end of the legs 482 are preferably used to secure the monitoring device 405 in position. As noted previously in connection with various other embodiments, the monitoring device 405 is preferably formed of a lightweight material and composed of lightweight components (e.g., low voltage battery, microcircuitry, etc.), and a benefit of such construction is that the device 405 can be more easily suspended with a mounting structure such as illustrated in FIG. 4A. To remove the monitoring device 405, the legs 482 are simply bent, flexed, or retracted, and the device 405 pulled up through the open manhole cover.

While no clamps or screws are necessary to secure the monitoring device 405 in the above example, in alternative embodiments, screws, clamps, mounting brackets, or other means for securing the monitoring device 405 may be utilized.

An advantage of various mounting structures and techniques described above is that the monitoring device 405 may be relatively simple and easy to install or remove, even by unskilled workers, and generally does not require the use of tools nor the need to drill into the wall of the manhole. Also, the monitoring device 405 can be installed without necessarily requiring workers to bodily enter the manhole enclosure, which can be advantageous in certain settings. For example, when a worker bodily enters a manhole enclosure, government regulations may impose special requirements, such as additional workers outside the manhole, the use of safety harness, an air supply, and so on, all of which increases cost and time of installation or removal.

In the example shown in FIG. 4A, the monitoring device 405 has a whip antenna 406 that is partially located within the housing 480 and partially extends atop the housing 480. The antenna 406 is preferably directional in nature, so as to maximize penetration through the manhole cover. However, other antenna configurations may also be employed. For example, a small diameter hole may be drilled through the manhole cover, and an antenna extension placed through the small hole to provide better wireless access. The tip of the antenna may be coated, glazed or sealed so that it lies flush with the surface of the manhole cover and is relatively secure thereon. The antenna extension may be connected via a cable or other means to the main housing 480 of the monitoring device 405. In another embodiment, an antenna may be placed on the surface of the manhole, and magnetic coupling used to transmit signals from inside the manhole through the externally located antenna. Other alternative antenna arrangements may also be used.

Figure 6A:
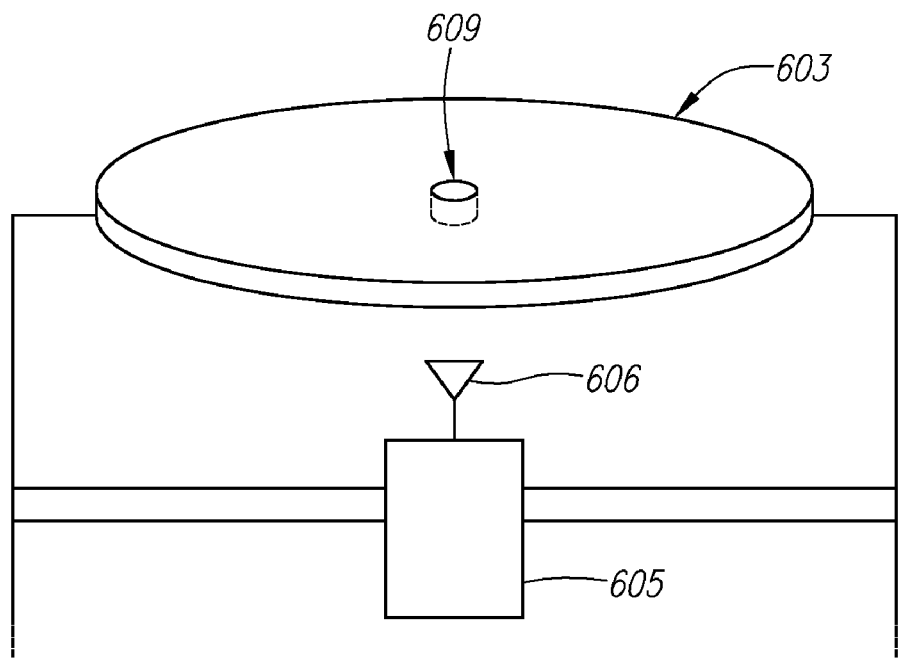
FIGS. 6A and 6B are diagrams illustrating an example of one type of antenna configuration for a monitoring device.
Figure 6B:
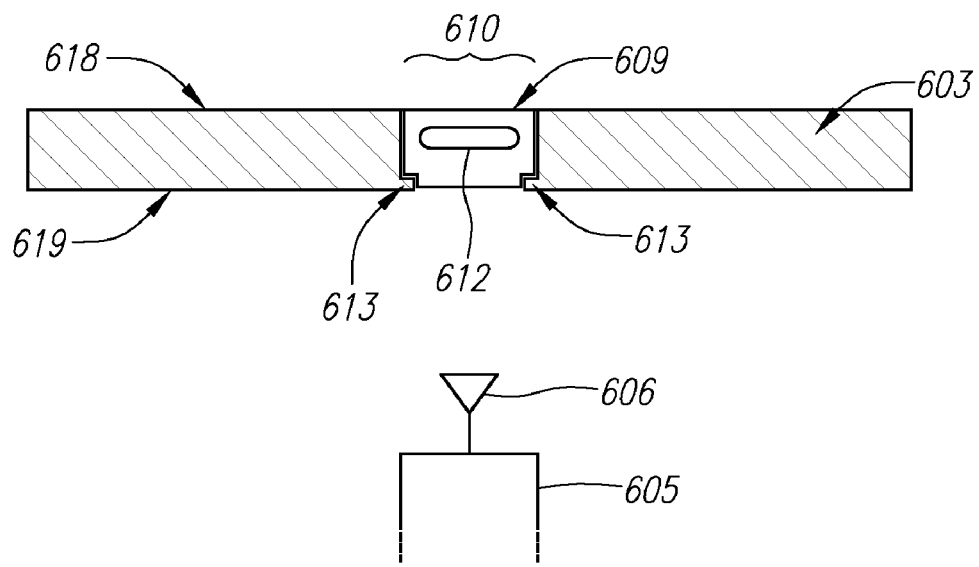

FIGS. 6A and 6B are diagrams illustrating an example of one such alternative antenna configuration. FIG. 6A shows an oblique view of a monitoring device 605 with an antenna piece 609 inserted into a hole in the manhole cover 603, while FIG. 6B shows a cross-sectional view of the antenna piece 609 inserted in the hole 610 in the manhole cover 603. The hole 610 may, for example, be counter-bored into the manhole cover 603 to provide a suitable resting location for the antenna piece 609. The antenna piece 609 may be of any size required to fit a suitable antenna array 612 (for example, it may be approximately two inches across), and may be any shape, although circular is preferred because of the ability to fit it within a circular hole that can be readily created from drilling into the manhole cover 603. Alternative shapes include, for example, a cone or funnel shape, or even a rectangular or polygonal shape where, for example, the manhole cover 603 has a pre-cast hole 610 that does not require drilling in the field. The hole 610 may be created from two drilling steps, a first step to bore a wide cylindrical insert, and a second step to bore a narrower hole through the base of the cylindrical insert, thus forming a lower lip 613 on which the antenna piece 609 can rest. Alternatively, a combined counter-bore drill bit may be used to drill the hole 610 in a single step. Preferably, the hole 610 is of a width such that the antenna piece 609 fits snugly therein, and the antenna piece 609 can be secured by screws, epoxy, or other means once inserted in the hole 610.

The antenna piece 609 is preferably manufactured of durable, resilient material such as plastic, that nevertheless allows for propagation of wireless signals both upwards, outside of the manhole 608, and downwards towards the monitoring device 605. Any of a variety of conventional wireless repeater antennas may be used or adapted for the antenna array 612 of the antenna piece 609; examples of conventional wireless repeater antennas which propagate signals through glass or other dielectrics are known, for example, in the automotive industry. The monitoring device 605 preferably includes a separate antenna 606 which wirelessly couples to the antenna array 612 within the antenna piece 609, to allow wireless communication between the monitoring device 605 and a wireless base station or network. The antenna piece 609 is preferably flush with the top surface 618 of the manhole cover 603 to prevent it from interfering with surface activity (for example, snow plow blades), but nevertheless should have a clear "horizon" view for optimal wireless reception and transmission. Likewise, the antenna piece 609 is preferably shaped such that it does not protrude from the bottom surface 619 of the manhole cover 603, so that the manhole cover 603 can be easily dragged along the ground without causing harm to the antenna piece 609. The antenna array 612 may constitute, for example, a directional-type antenna, so that loss of energy is minimized.

In certain embodiments, in order to provide as close proximity as possible between coupled antenna elements, the antenna 606 connected to the monitoring device 605 is formed as or contained within a springy wire loop that touches or nearly touches the underside of the antenna piece 609. The flexibility of the antenna 606 in such an embodiment can help prevent damage when the manhole cover 603 is removed (since the manhole cover 603 is heavy, it may be swept across the manhole opening just above the monitoring device 605).

Figure 7:
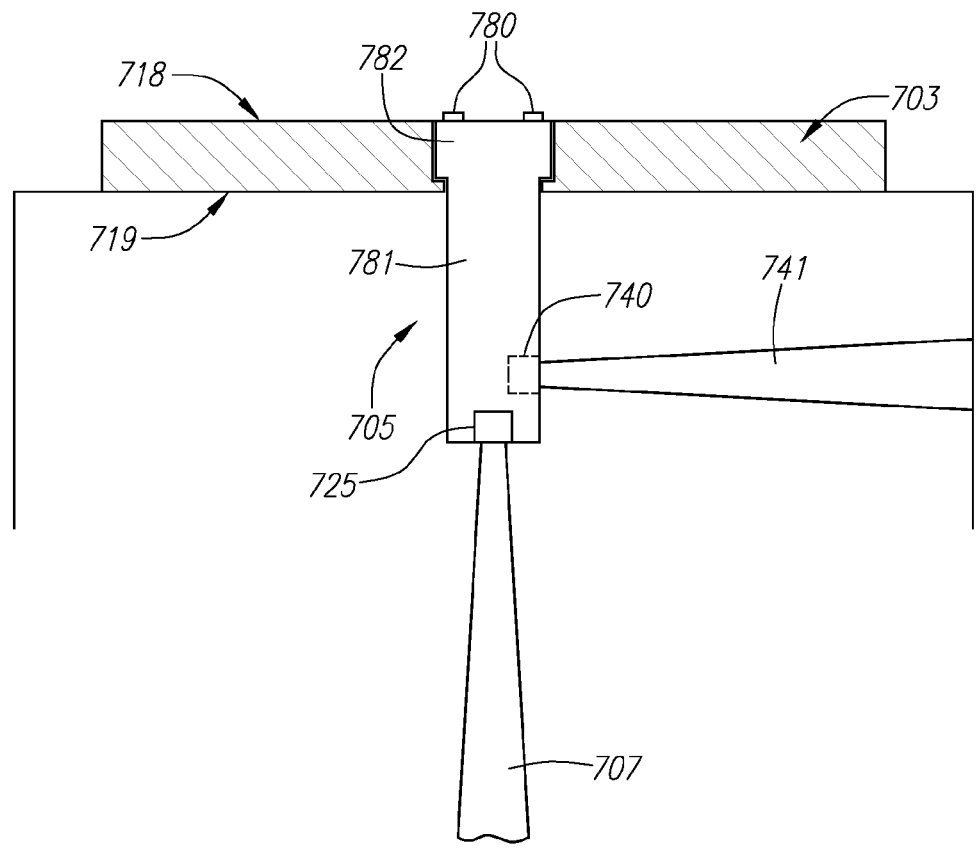
FIG. 7 is a diagram illustrating a monitoring device adapted for drop-down insertion into a manhole.
Figure 8:
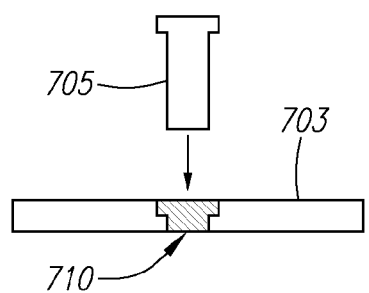
FIG. 8 is a diagram illustrating an example of insertion of the monitoring device of FIG. 7 into a manhole.

FIG. 7 is a diagram illustrating another embodiment of a monitoring device 705 that may be of particular utility in situations where obtaining a sufficiently clear signal path to a wireless network is otherwise difficult. The monitoring device 705 preferably has a cylindrical body 781 terminated in a slightly wider cylindrical cap 782, to allow the monitoring device 705 to be securely inserted, in a drop-down fashion, into a counter-bored hole (similar to that described with respect to FIG. 6B) in a manhole cover 703. FIG. 8 illustrates how the monitoring device 705 may be inserted into a counter-bored hole 710 the manhole cover 703.

The monitoring device 705 preferably includes, encapsulated within the body 781 and/or cap 782, the various internal components illustrated for the monitoring device 300 in FIG. 3. However, the monitoring device 705 may include additional or fewer components. The depth sensor 725 may be positioned at the base of the body 781 to allow an unobstructed view of the floor of the manhole cavity. As is described in greater detail below with respect to FIG. 5, a second sensor 740 may optionally be positioned on the side of the housing 781 of the monitoring device 705, to detect if the manhole cover 703 (and thus the monitoring device 705) has been removed or otherwise moved from its ordinary resting position. The second sensor 740 may alternatively be a pressure-type sensor that is placed between the manhole cover 703 and the perimeter of the manhole opening, to detect if the manhole cover 703 is moved from its ordinary resting position. An antenna (not explicitly shown in FIG. 7) may be located in the cap 782 of the monitoring device 705, to provide an optimum wireless signal path to remote wireless transmitters and/or receivers. The antenna may be any compact type antenna having electrical characteristics suitable for communication in the intended location/placement of the monitoring device 705. In certain embodiments, the antenna may be embedded in plastic to isolate it from the metal of the manhole cover 703. Since the monitoring device 705 has surface accessibility, it may optionally be outfitted with, e.g., solar cells 780 to allow re-charging of the battery during daylight operation.

An advantage of the configuration of the monitoring device 705 in FIG. 7 is that it can be placed in a manhole cover 703 without the need to remove the manhole cover 703 (which can be a somewhat difficult task since manhole covers are fairly heavy and may be hard to dislodge due to, e.g., accumulation of sediments, etc.). To facilitate placement of the monitoring device 703, a counter-bore hole can be drilled into the manhole cover 703, and the monitoring device 705 dropped into the counter-bored hole and secured. The monitoring device 705 can be secured to the manhole cover 703 in any of a variety of ways. For example, it may be bolted to the manhole cover 703 or otherwise locked into place.

Figure 9:
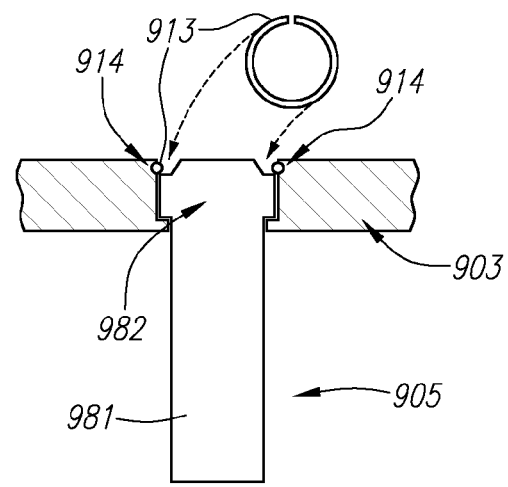
FIG. 9 is a diagram illustrating an example of a drop-down monitoring device secured to a manhole lid by a retaining ring.

In one embodiment, illustrated in FIG. 9, the monitoring device 905 is secured in place by a retaining ring 913. The retaining ring 913 may be compressed prior to being inserted into the hole just above the cap 982 of the monitoring device, and then released so that it snaps out and conforms to the shape of a circular groove 914 surrounding the cap 982 of the monitoring device 905. The spring-like action of the retaining ring 913 serves to keep it locked in place. Retaining ring pliers may be used to facilitate removal of the retaining ring 913 and thus removal of the inserted monitoring device 905. In this particular embodiment, the cap 982 may be raised in the center to provide a flush surface with the top surface 918 of the manhole cover 903.

The actual shape and dimensions of the monitoring device 705 may vary depending upon a number of factors. For example, it may, in certain situations (especially, e.g., where peripheral monitoring devices are not going to be used), be possible to fit all necessary electronics (including a battery/power supply) and sensor components in a housing roughly the size of the antenna piece 609 shown in FIG. 6, in which case the monitoring device 705 may be approximately the size and shape of the upper cap 782 shown in FIG. 7. As another example, the upper cap 782 and/or body 781 of the monitoring device 705 may be non-cylindrical in shape. As but one illustration, the manhole cover 703 may be cast with a pre-fabricated square hole (with a protruding lower lip) into which a square-shaped monitoring device 705 may be inserted. As another illustration, the upper cap 782 may be tapered (conical) or funnel-shaped, and the hole may be of matching shape (either drilled on site or pre-molded in the manhole cover 703). Of course, other shapes and sizes may be utilized. A cylindrical shaped monitoring device 705 is preferred in those applications where pre-existing manholes may require drilling in order to retrofit with the monitoring device 705.

Figure 5:
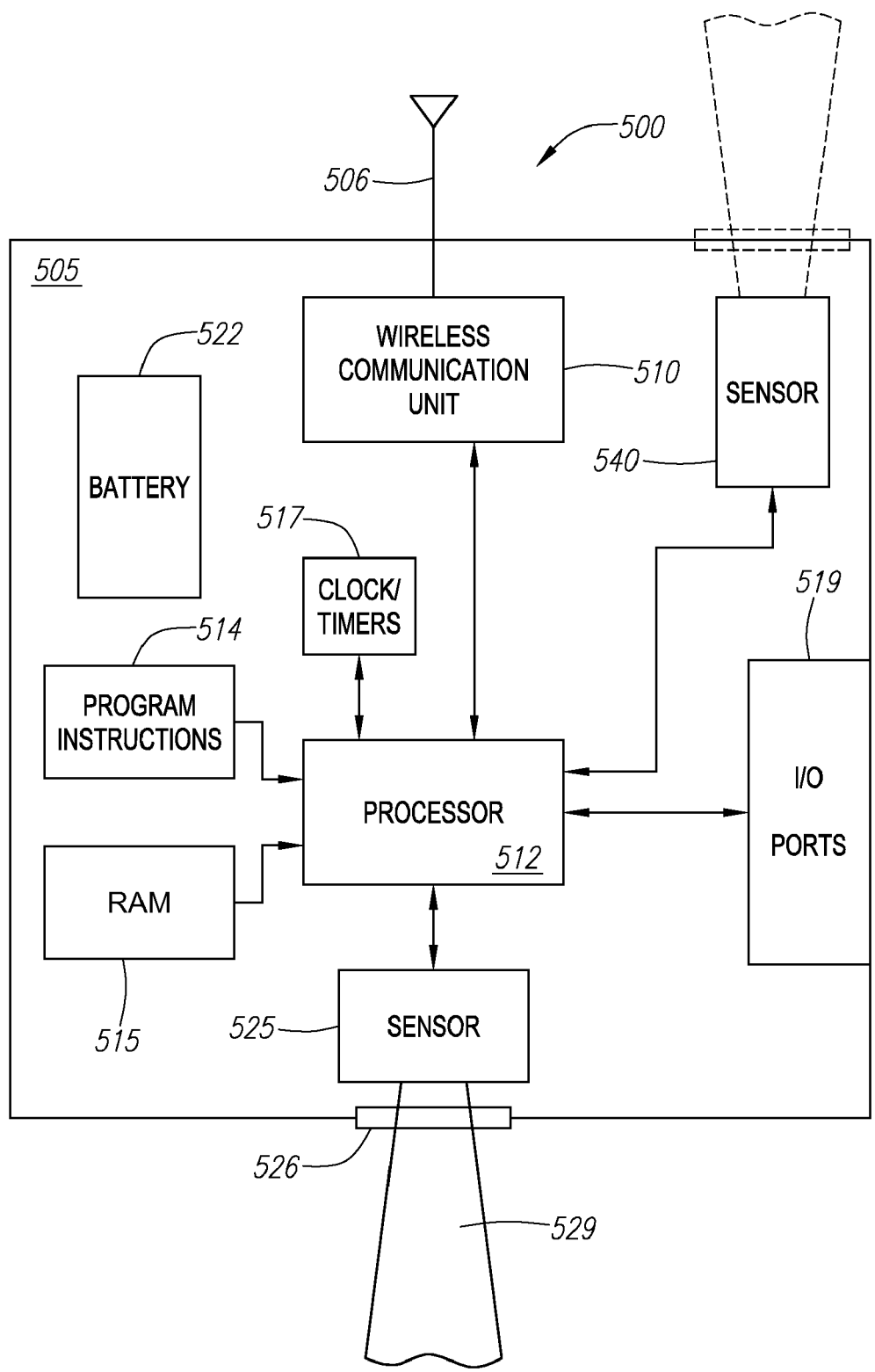
FIG. 5 is a block diagram illustrating an alternative embodiment of a monitoring device.

FIG. 5 is a block diagram illustrating an alternative embodiment of a monitoring device 500, as may be employed, for example, in the monitoring system 100 shown in FIG. 1, or other such systems. Among other things, the monitoring device 500 shown in FIG. 5 provides some degree tamper resistance with respect to the manhole 108 in which it is installed. In the example of FIG. 5, elements labeled with reference numerals "5xx" are generally similar to their counterparts labeled with "3xx" in FIG. 3. However, the monitoring device 500 in FIG. 5 includes some additional features. The monitoring device 500 in FIG. 5 comprises, in addition to a first sensor 525 for taking depth measurements, a second sensor 540 for detecting whether the manhole cover 103 has been tampered with. The second sensor 540 may be embodied, for example, as a pressure sensor, with a pressure plate to be positioned such that if the manhole cover 103 is raised, the reduction in pressure will be detected. Alternatively, the second sensor 540 may be embodied as an optical (e.g., infrared) or ultrasonic detector, oriented upwards towards the manhole cover 103. The second sensor 540 may be initialized or calibrated to the distance of the manhole cover 103. If the manhole cover 103 is raised or removed, the second sensor 540 detects the change and registers an alert or alarm condition. In such a case, the monitoring device 500 is preferably configured to transmit an alarm signal indicating tampering to the remote monitoring station 170 to place the appropriate personnel on notice.

If the second sensor 540 is required to sample periodically, the interval between sample periods is preferably programmable or otherwise selectable. The time between samples may, for example, be programmable via wireless commands received from the remote monitoring station 170. The second sensor 540 might be commanded to sample more frequently prior to or during important events in the local area, such as a parade, etc., where it may be considered important to ensure that manholes are not removed or otherwise tampered with. Likewise, the monitoring device 500 may be programmed to report back more frequently to the remote monitoring station 170 during such events. The failure to receive an expected reporting transmission at the remote monitoring station 170 at a particular time may result in an alarm or alert signal being generating at the remote monitoring station 170, indicating the monitoring device 500 may have malfunctioned or else been tampered with. In the absence of extraordinary events, the sampling period may be selected so as to provide the desired level of security while at the same time maximizing battery life.

In certain embodiments, the remote monitoring station 170 may, pursuant to programmed instructions or manual commands entered via the user interface 173, transmit a status request signal to the monitoring device 500, requesting verification that the manhole cover is in place. Upon receiving such a status request signal, the monitoring device 500 activates the second sensor 540, obtains a reading, and transmits the information back to the remote monitoring station 170. This operation allows greater flexibility in verifying the proper placement of manhole covers without necessarily having to increase the sampling/reporting rates of the second sensor 540 significantly, and can advantageously be used for test and verification purposes as well.

Alternatively, or in addition, a photocell sensor can be used in the monitoring device 500, to detect the presence of light entering the manhole (thereby indicating that the manhole cover has been removed or that a source of light, such as a flashlight or lantern, is nearby).

Figure 10:
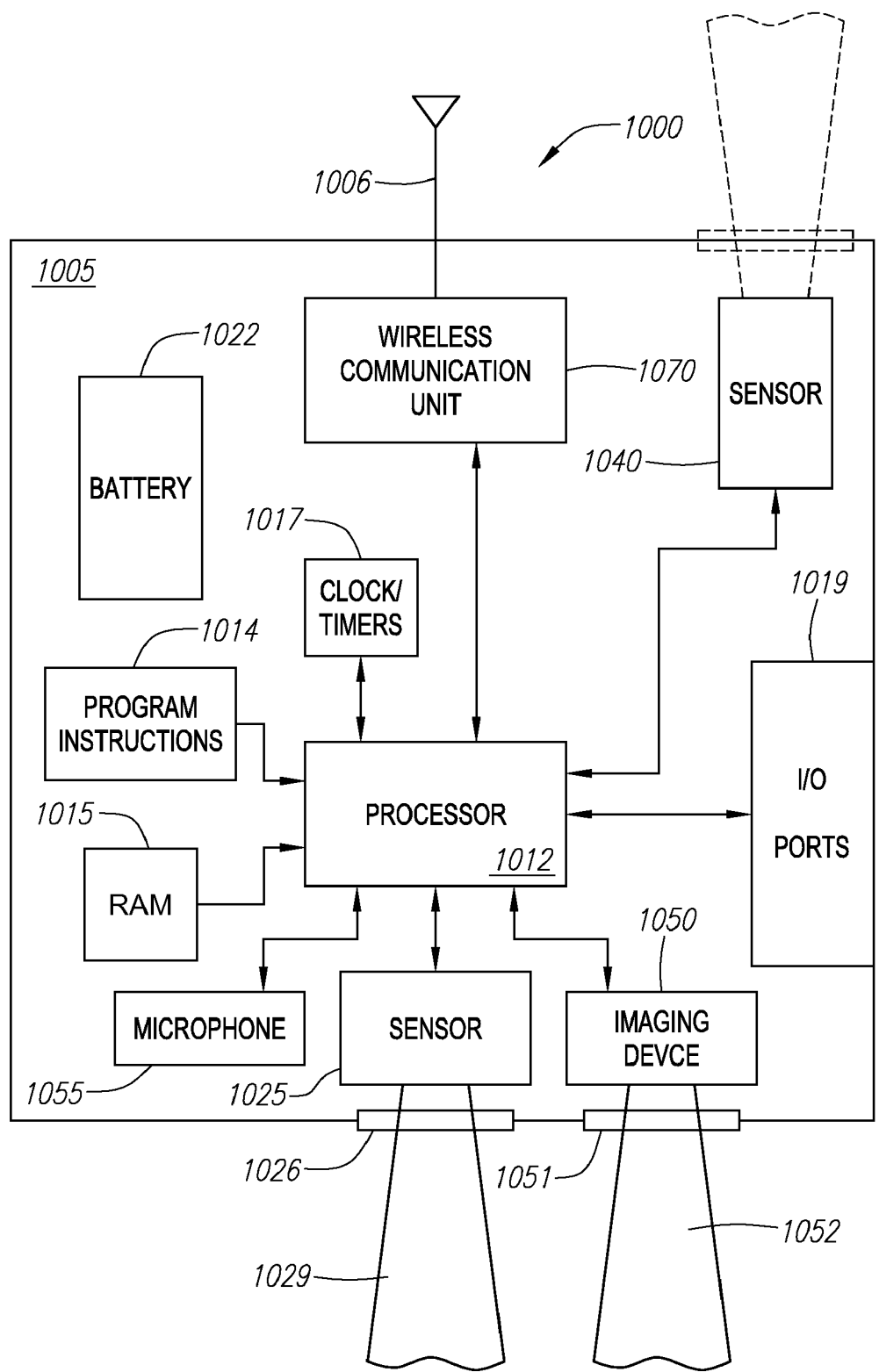
FIG. 10 is a block diagram illustrating another embodiment of a monitoring device, having a digital camera.

In any of the various embodiments, a monitoring device may be outfitted with a digital camera or other imaging device, and/or a microphone, for collecting visual images and/or audio data which can be stored or transmitted directly to the remote monitoring station. The visual or audio data may be used to verify an alert condition, allow engineers or field workers to make remote observations, or provide an additional level of security. The digital camera or imaging device, and/or microphone, may be integrated as part of the monitoring device, or else may be an external component connected to one of the monitoring device's input/output ports. FIG. 10 is a block diagram illustrating an embodiment of a monitoring device 1000, having a digital camera or imaging device 1050. In FIG. 10, components denoted with reference numerals "10xx" generally correspond to the similar components denoted with reference numerals "3xx in FIG. 3 or "5xx" in FIG. 5. The monitoring device 1000 illustrated in FIG. 10 thus may include a housing 1005, a battery 1022, a processor 1012, a non-volatile memory portion 1014, a volatile (RAM) memory portion 1015, various clocks and/or timers 1017, one or more input/output (I/O) ports 1019 (which can optionally be connected to various peripheral monitoring devices or instruments 1020), and a wireless communication unit 1010 coupled to an antenna 1006, all as previously described with respect to FIGS. 3 and 5. The monitoring device 1000 may also include a sensor 1025, such as an ultrasonic sensor, for measuring depth in the manhole as needed, and optionally another sensor 1040 which may be positioned so as to detect when the manhole cover 103 has been tampered with. The digital camera or imaging device 1050 may operate under control of the processor 1012, and may be invoked at periodic intervals, upon detection of events by the primary sensor 1025 and/or second sensor 1040, or upon request from the remote monitoring station 170. Likewise, a microphone 1055 may operate under control of the processor 1012, and may be invoked at periodic intervals, upon detection of events by the primary sensor 1025 and/or second sensor 1040, or upon request from the remote monitoring station 170.

The digital camera or imaging device 1050 may be oriented, for example, downwards to provide observation of the base of the manhole 108 or other location, or upwards to provide observations of the manhole cover 103 or other features. The digital camera or imaging device 1050 may view through a window 1051 (similar to window 1026 through which sensor 1025 views) or else may, for example, be mounted to the exterior of the monitoring device 1000, or view through a fiber optic cable. The digital camera or imaging device 1050 may also share a common window with the sensor 1025. The digital camera or imaging device 1050 may also be used to take an image of a meter within the manhole or other area. The image can then be transmitted back to the remote monitoring station 170, where it may, if a visual meter reading, optionally be processed with optical character recognition (OCR) software to convert the image into a numerical value. A mirror (possibly movable) may be used to allow a single digital camera or imaging device 1050 to view more than one area. The digital camera or imaging device 1050 may comprise, in one example, a CMOS image sensor, or else a CCD image sensor (which may use more power, however, than a CMOS image sensor). The digital camera or imaging device 1050, and/or microphone 1055, may be remotely controlled through the remote monitoring station 170, and/or may be programmed to take periodic snapshots of visual or audio data according to a selectable time schedule. The data may be stored in RAM 1015 or in non-volatile memory 1014 for later readout.

Figure 11:
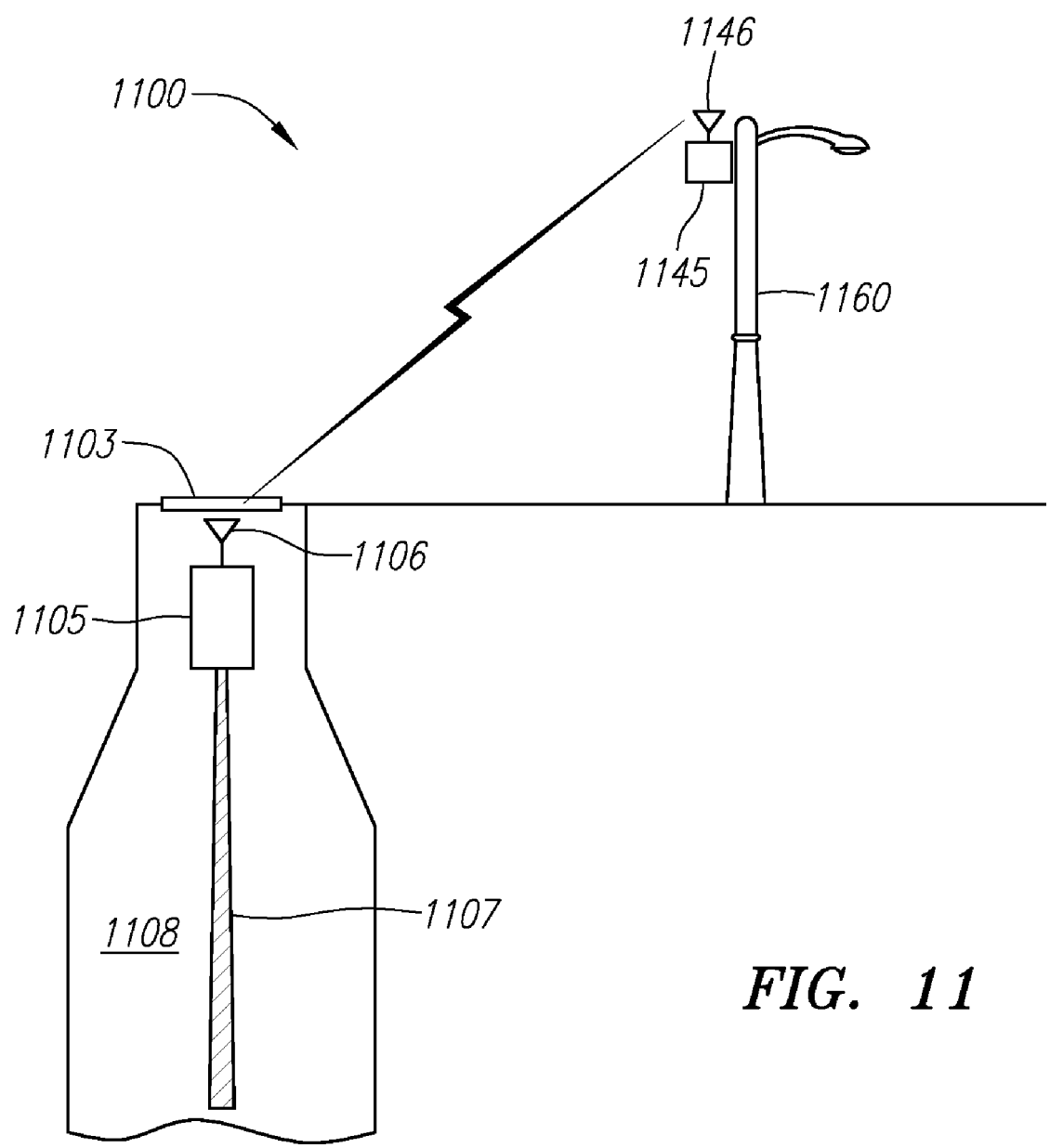
FIG. 11 is a block diagram of a portion of a monitoring system including an end node and a street node.

In certain environments, it may be advantageous for the monitoring system to include a local wireless relays in a distributed, self-forming wireless network which may provide, e.g., redundant communication paths for the various monitoring devices. Such a network may be referred to as a mesh network for its ability to form new communication paths and/or redundant communication paths, in a distributed fashion. FIG. 11 is a block diagram of a portion of a monitoring system 1100 including a monitoring device 1105, which may sometimes be referred to herein as an "end node," and a local wireless relay device 1145, which may sometimes be referred to herein as a "street node." The monitoring device 1105 may be embodied as any of the monitoring devices as previously described herein, such as those depicted for example in FIG. 3, 5 or 10, and is generally positioned in a location for monitoring depth (e.g., water level) such as in a manhole 1108, a storm drain, or other suitable location. The monitoring device 1105 preferably comprises a two-way wireless communication unit and antenna 1106 for communicating with the local relay device 1145. Likewise, the local wireless relay device 1145 preferably comprises a two-way wireless communication unit and an antenna 1146 for communicating with the monitoring device 1105, and, in certain embodiments, with bridge nodes for conveying the monitored data to a remote monitoring station.

The local wireless relay device 1145 is ideally located in relatively close physical proximity to the monitoring device 1105—for example, attached or secured to a nearby telephone/utility pole or streetlamp 1160—to minimize the distance that the RF signals from the monitoring device 1105 need to travel. The local wireless relay device 1145 may have an independent power source (e.g., battery), and/or may advantageously be connected to a power socket of the streetlamp 1160. Using the power socket of the streetlamp 1160 may significantly reduce the maintenance required for the overall monitoring system, and may allow the local wireless relay device 1145 to communicate more frequently without necessarily a concern for premature drain of the battery. If a streetlamp 1160 is not in the vicinity of the monitoring device 1105, the local wireless relay device 1145 may alternatively be connected to another continuous electrical power source that is in the area (including drawing power from utility lines, if placed on a utility pole), or else may rely on battery power.

Figure 13:
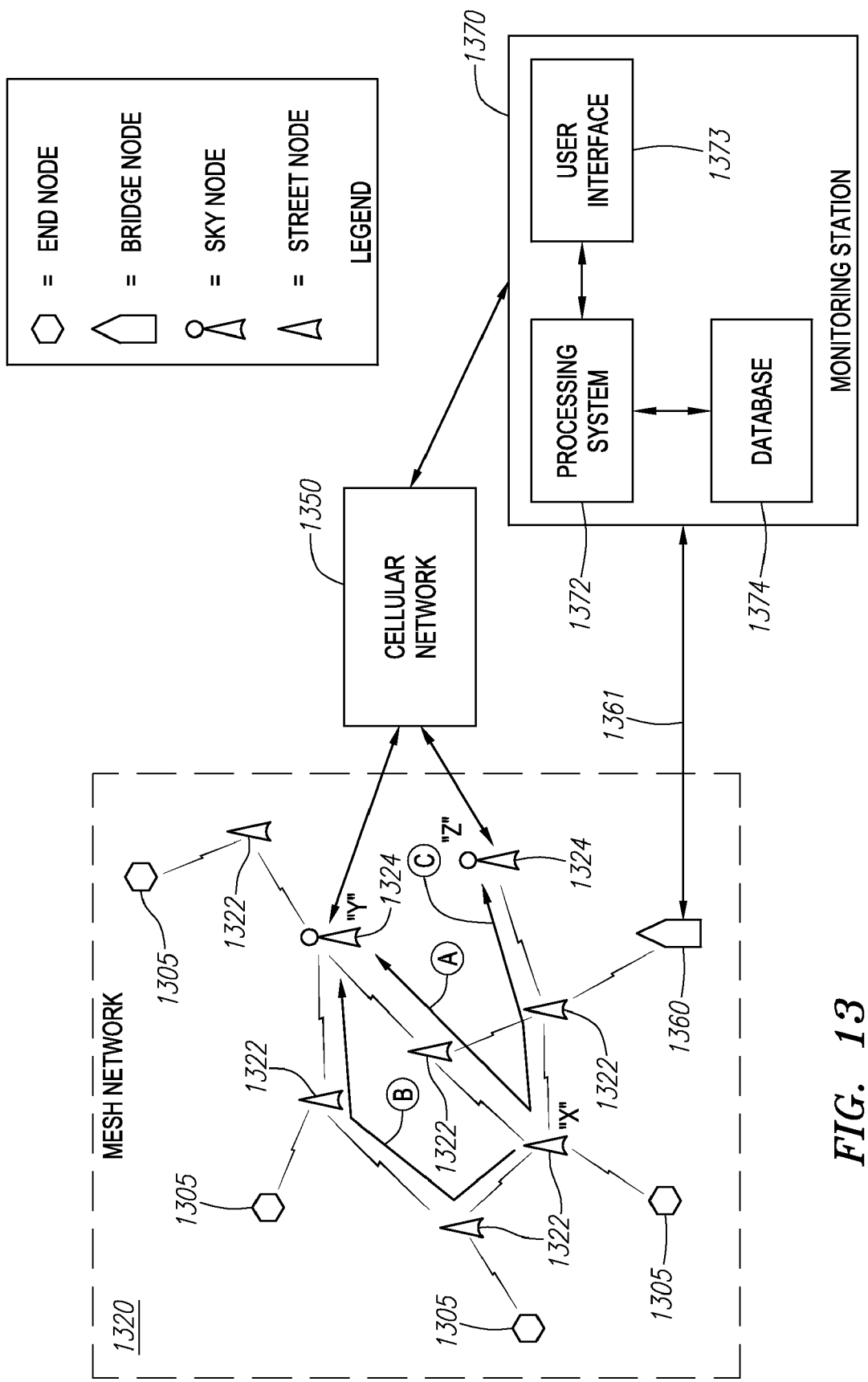
FIG. 13 is a block diagram of a monitoring system utilizing a mesh network, according to a preferred embodiment as disclosed herein.

The wireless communication unit 1107 of the monitoring device 1105 may be embodied as a low power RF wireless device, such as a one-watt radio transceiver, which transmits an RF signal through the manhole 1103 in order to communicate with the local wireless relay device 1145, and likewise receives an RF signal through the manhole 1103 from the local wireless relay device 1145. Similarly, the wireless communication unit of the local wireless relay device 1145 may be embodied as a low power RF wireless device, such as a one-watt radio transceiver. In turn, the local wireless relay device 1145 may rebroadcast the information received from the monitoring device 1105 to other local wireless relay devices and eventually to the remote monitoring station, as will be explained with respect to a more complete system as depicted in FIG. 13. The local wireless relay device 1145 may use the same radio transceiver to propagate data to other devices in the network, or may, if desired, use a different transceiver and different communication protocol.

FIG. 13 is a high-level diagram of a monitoring system 1300 utilizing, among other things, a plurality of local wireless relays to form, in one aspect, a distributed, self-forming wireless network, according to a preferred embodiment as disclosed herein. In the example of FIG. 13, the monitoring system 1300 includes four different types of nodes, although in variations other types of nodes may be added, or some of the nodes may be omitted. The nodes are arranged to communicate in a mesh network 1320, which preferably acts as a distributed, self-forming and self-healing network allowing the monitoring devices 1305 to communicate via redundant data paths to the remote monitoring station 1370. The monitoring devices 1305, or end nodes, may be constructed, for example, according to any of the embodiments previously described herein. The monitoring devices 1305 communicate with various other nodes of the distributed mesh network 1320. In this particular example, the mesh network 1320 includes two different types of nodes—local wireless relay devices 1322, or "street nodes" (as described with respect to FIG. 11), and bridge nodes (such as cellular gateway nodes 1324 or "sky nodes"). Examples of such devices are described hereinafter in connection with FIGS. 12A and 12B.

The monitoring devices 1305, or end nodes, each manage one or more data sensors and provides timing, control, data and programming storage, and wireless communication functions to allow remote monitoring of the activity and operation of the monitoring devices 1305 by the remote monitoring station 1370. The monitoring devices 1320 communicate with the local wireless relay devices 1322, or street nodes, according to techniques generally described above with respect to FIG. 11. Once a local wireless relay device 1322 receives information from a monitoring device 1305, and depending upon how often and under what circumstances the remote monitoring station 1370 needs to receive information, the local wireless relay device 1322 conveys the data through the mesh network 1320 until the data arrives at a bridge node, such as, for example, a cellular gateway node 1324, or "sky node." The cellular gateway node 1324 may then convey the data over a cellular network 1350 to the remote monitoring station 1370. The remote monitoring station 1370 may use the same communication path to send messages back to the monitoring devices 1305, for the purpose of, e.g., requesting additional information (including from a different sensor, if provided) on the monitoring device), changing program parameters or the monitoring cycle, changing modes, modifying the instructions for the monitoring routine or other functions, or requesting some type of action.

In certain embodiments, in addition to or instead of using cellular gateway nodes 1324 as the bridge nodes, the mesh network 1320 may include a bridge node 1360 that relies primarily on landlines 1361 for conveying data to the remote monitoring station 1370. The cellular gateway nodes 1324 may allow for increased flexibility in terms of deployment and regions of service, however.

While only a limited number of monitoring devices (i.e., end nodes) 1305, local wireless relay devices (i.e., street nodes) 1322, and bridge nodes 1324, 1360 are depicted in FIG. 13 for purposes of illustration, the principles of FIG. 13 may be extrapolated to a mesh network 1320 of arbitrarily large size, with an arbitrary number of nodes of each type.

According to one embodiment, the data carried by radio signals from a monitoring device 1305, or end node, to a local wireless relay device 1322, or street node, can "mesh hop" to reach an available bridge node, such as a cellular gateway node (i.e., sky node) 1324. "Mesh hopping" permits data to find the most efficient path to a cellular gateway node (i.e., sky node) 1324 or other bridge node, and helps prevent data loss by providing redundant paths back to a central server or other computer at the remote monitoring station 1370. This network topology permits large scale installations where each monitoring device (end node) 1305 generally communicates to a single local wireless relay device (street node) 1322, in a one-to-one fashion, but where the street nodes 1322 all communicate with one another and can pass data along to strategically placed bridge nodes, such as cellular gateway nodes 1324 or other bridge node 1360, which operate in a many-to-one mode. The street nodes 1322 (and the bridge nodes 1324, 1360) may inter-communicate using any available communication protocol, but preferably one that is relatively low power, resistant to interference, and compatible with other wireless communication systems as may geographically overlap the mesh network 1320. For example, the street nodes may communicate using a spread spectrum technique.

In the example in FIG. 13, the cellular gateway nodes 1324 or other bridge node(s) 1360 preferably have the same basic capabilities as the local wireless relay devices 1322, and hence operate in one aspect as a street or mesh node, but they also are capable of hand-shaking to another form of network, such as a cellular network 1350 (which typically will be a publicly available network). The cellular gateway node 1324 may utilize, for example, a code-division multiple access (CDMA) or GSM transmission technique, or any other available technique, to communicate via cellular network 1350, according to the requirements of the provider of the cellular network 1350. Data from the cellular gateway node 1324 is routed across the cellular network 1350 to the remote monitoring station 1370 where it may be, e.g., disseminated via an Ethernet connection, and/or may be conveyed to a destination such as a PC or a database, so that the data can be properly stored and acted upon. Alternatively, the data may be transported over a landline connection 1361 via the bridge node 1360, and thus the remote monitoring station 1370.

Mesh networking possesses several characteristics that result in an intelligent, self-forming and/or self-healing wireless network. Although in certain cases nodes may server different or overlapping functions, in general the end node in the mesh network 1320 represents a termination point where data is collected—i.e., the monitoring devices 1305 with built-in sensor(s) to collect data. A mesh node is generally a node that passes along data to other mesh nodes, or to a bridge node. A bridge node conveys data to a remote monitoring station, and/or bridges to another type of network. According to one embodiment, the mesh network 1320 self-forms by allowing individual local wireless relay devices (street nodes) 1322 and bridge nodes (such as cellular gateway nodes, or sky nodes 1324, or other bridge nodes 1360) to listen for, and associate themselves, with the strongest signals emitted by the other nodes around them in the mesh network 1320 to determine the ultimate routing paths for delivering the data. Thus, while various wireless communication paths are illustrated in basic example of the mesh network 1320 in FIG. 13, over time those paths may change, and new paths may be established, either as environmental conditions change, nodes go off-line or are removed, or new nodes are added. This type of operation results in a "mesh-like" network topology that may change from instance to instance, depending on the environment or data payload.

The mesh-like operation may be illustrated by way of example with the layout in FIG. 13. There, data may be transported from the local wireless relay device (street node) 1322 at point "X" to a cellular gateway node (sky node) 1324 at point "Y" via two different data paths denoted "A" and "B" each utilizing different local wireless relay devices 1322. Alternatively, and depending upon the conditions or the availability status of the various other nodes in the mesh network 1320, the data may be transported via other local wireless relay devices 1322 to a different cellular gateway node (sky node) 1324 at point "Z" shown in FIG. 13. Thus, particularly in a large network deployment, there would be numerous alternative paths for conveying data from a particular monitoring device (end node) 1305 to the remote monitoring station 1370, and those paths may dynamically change with time.

A variety of different communication protocols may be used within the mesh network 1320. Nodes may associate or de-associate themselves with the mesh network 1320 in a variety of different manners as well. According to one example, a node interacts with the mesh network 1320 by sending an association request to associate it with the mesh network 1320, and then transmits data over the mesh network 1320 upon being accepted as part of the network. To initiate communication, a monitoring device 1305, or end node, may first detect the network presence (by listening to communications occurring within the mesh network 1320), and then send out an association request at a certain predetermined time window and/or at a certain time interval. The time interval can be predetermined (e.g., every 5 minutes), or else may be trigged by an event (such as, for example, when a sensor detects motion). The mesh nodes listen for these association requests and, upon detection, send the detected association request along to the node's nearest bridge, such as a cellular gateway node 1324 or other bridge node 1360. The cellular gateway node 1324 or other bridge node 1360 broadcasts signals back through the various mesh nodes of the mesh network 1320 to the end nodes 1305, which creates a routing path for the data to travel upon. Each mesh node 1305 ranks the strength or quality of the routing responses it observes from the various links, or "meshes," and may select the best or highest quality link as its primary route, the second highest quality link as its secondary route, etc., and thereby forms the routing path. This process is repeated throughout the mesh network 1320, such that if a particular cluster of links are broken, the mesh nodes find other paths to get the data to a live bridge node 1324 or 1360 by, e.g., using their second or third choice routes.

In certain embodiments, the individual nodes of the mesh network 1320 may use a frequency hopping technology that allows the nodes to communicate over different frequencies at different times, thereby potentially minimizing interference from other networks that geographically overlap with the mesh network 1320. For example, the street nodes 1322 and bridge nodes 1324, 1360 may employ a frequency-hopping spread spectrum (FHSS) technique, or else may periodically switch communications to different frequencies in an attempt to reduce interference, particularly if all of the incoming signals are weak or have errors.

Figure 14:
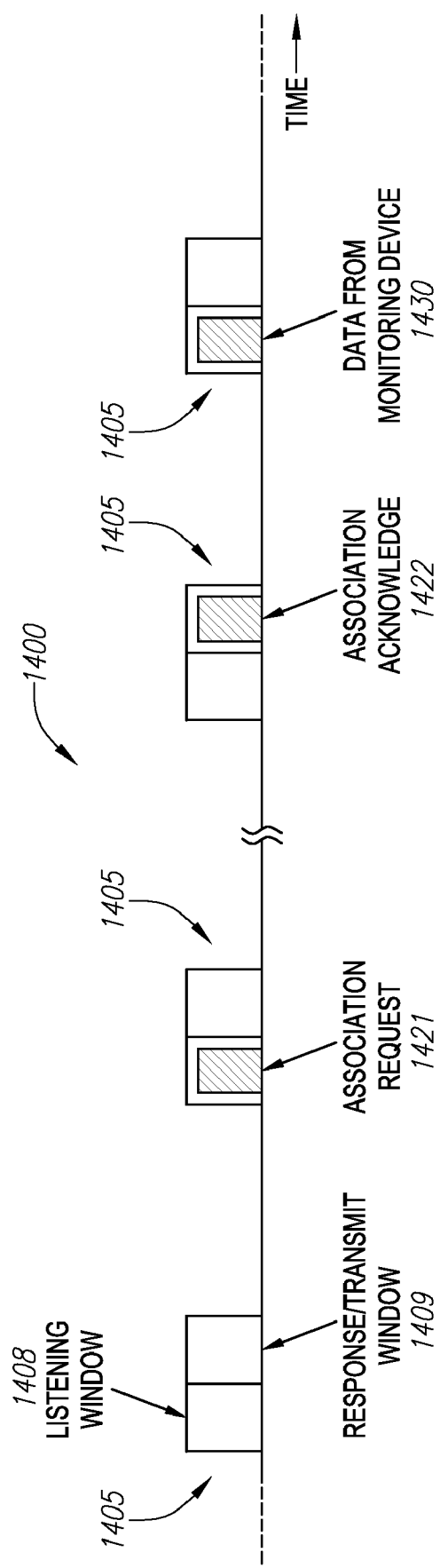
FIG. 14 is a diagram illustrating an example of communications within a mesh network such as depicted in FIG. 13.

The fact that the mesh nodes generally will be regularly listening for communications from other mesh nodes, or end nodes, can be taxing from a power consumption perspective, and may be a consideration in designing the scalability of mesh. FIG. 14 is a timing diagram illustrating one possible protocol by which a measure of power conservation may be achieved. In FIG. 14, a repeating time window is used to define time periods when a monitoring station may be active for transmitting event data and listening for responses or other information from the mesh network 1320. Monitoring devices 1305 may stay synchronized by listening, for example, for a periodic time marker that is propagated from a central location in the mesh network 1320 via the local wireless relay units 1322. In this example, shown from the perspective of a local wireless relay unit 1322, a repeating time window 1405 is divided into a listening period 1408 in which monitoring devices 1305 generally transmit to the local wireless relay unit 1322, and a response/transmit period 1409 during which the local wireless relay unit 1322 transmits or otherwise responds to the monitoring devices 1305. This timing structure allows the monitoring units 1305 to remain "asleep" during designated time periods, thereby conserving battery power. The local wireless relay unit 1322 may also remain in a sleep state during periods where it does not expect to receive transmissions. The frequency of the time window 1405 may vary depending upon, e.g., the alert stage of the overall system or a particular monitoring device 1305. In terms of communicating with other mesh nodes, the local wireless relay unit 1322 may transmit or receive data during a different time window (not shown in FIG. 14) reserved for communication among the mesh nodes.

FIG. 14 further illustrates an association request 1421 transmitted in a listening period 1408 of the time window 1405 from a monitoring device 1305 to a local wireless relay unit 1322. The association request 1421 indicates the desire of the monitoring device 1305 to associate itself with the mesh network 1320. The local wireless relay units 1322 listen for these association requests and, upon detection, send the detected association request along to the nearest bridge, such as a cellular gateway node 1324 or other bridge node 1360. At some later point, the local wireless relay unit 1322 receives an acknowledgment from the bridge, and conveys an association acknowledgment message 1422 to the monitoring device 1305 during the response/transmit period 1409 of a subsequent time window 1405. Thereafter, the monitoring device 1305 may send data to the local wireless relay device 1322 and receive data or other information in return, during subsequent time windows 1405.

Although in a preferred embodiment a local wireless relay device 1322 associates with a single monitoring device 1305, in other embodiments a local wireless relay device 1322 may associate with multiple monitoring devices 1305. The local wireless relay device 1322 may accomplish multiple association by, e.g., establishing different time windows for communicating with the different monitoring devices 1305.

The particular architecture of the mesh network 1320 provides it with the ability to utilize or be maintained over a large variety of wired and wireless formats including, for example, 900 Mhz radio, 2.4 Ghz radio, CDMA cellular, GSM/GPRS cellular, Ethernet cable, ISDN cable, serial cable, or others. Using TCP/IP at the bridge/gateway level, the mesh network 1320 may allow ready integration with new wireless formats as technology becomes available; for example, it may be adaptable to WiMax radio, which has recently been publicized but is not yet commercially available. Similarly, reporting to end users from the remote monitoring center 1370 can be made essentially platform agnostic, by relying upon a SQL (Structured Query Language) database which can dynamically push and pull the data into multiple formats (e.g. voice/phone, website, SMS, email, etc.).

The various nodes in the mesh network 1320 may pass along information concerning the frequency, reliability, and other statistical or analytical information concerning node inter-communications to the remote monitoring station 1370, which may maintain, for example, the number of readings received and number of packets forwarded by each node. Reports may be generated for operators at the remote monitoring station 1370 to assess the status of the mesh network 1320. This information may allow the operators to, for example, recommend adding new local wireless relay devices 1322 or bridge nodes 1324, 1360 to the mesh network 1320, or changing the location of certain nodes, or making other adjustments as may be necessary to improve communications within the mesh network 1320. The mesh network 1320 also has the ability, via the remote monitoring center 1370 or otherwise, to remotely update firmware on each of the mesh nodes, to permit for example new software functionality to be introduced remotely and to assist in network management and improvement.

Figure 12A:
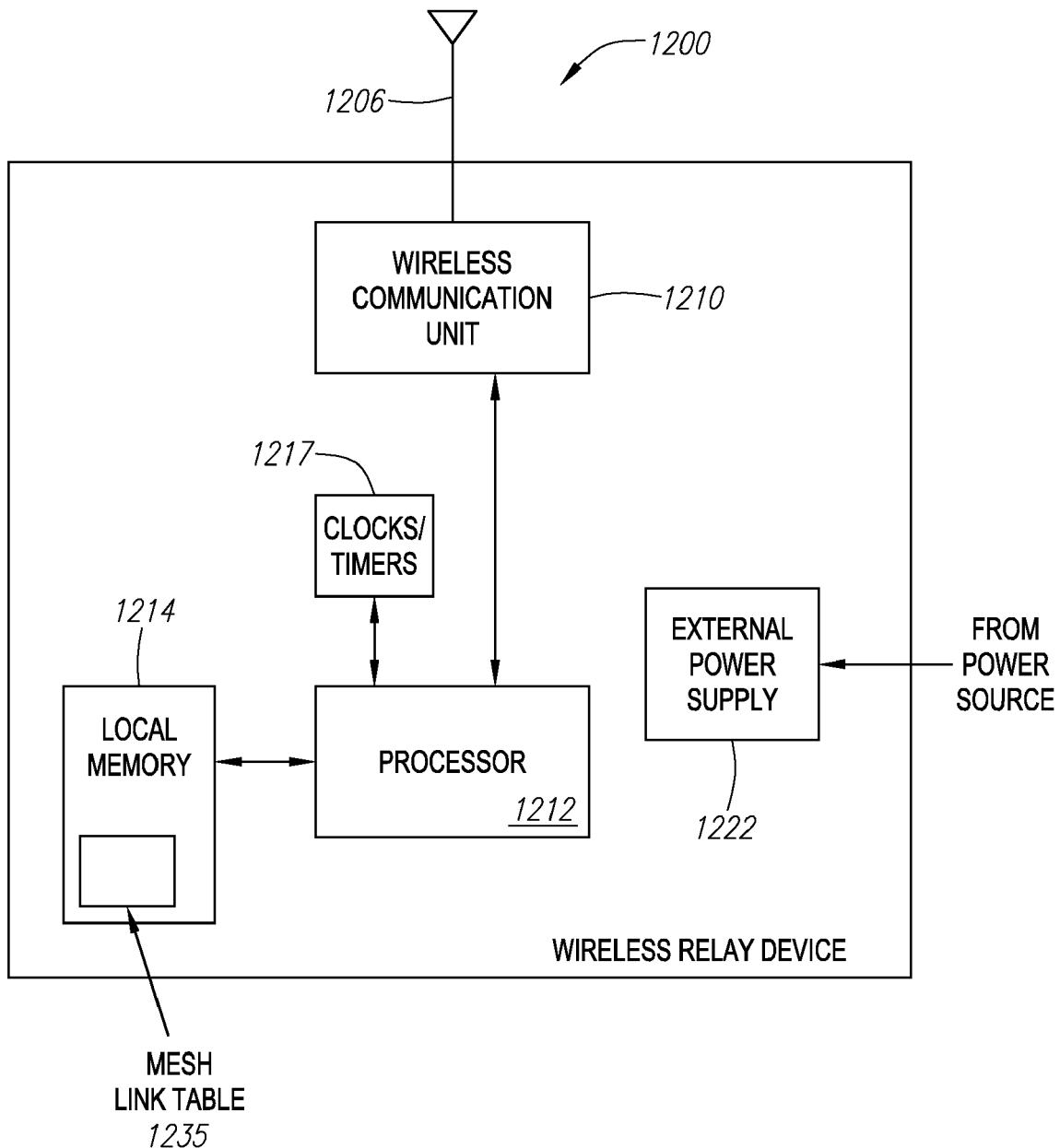
FIG. 12A is a block diagram of an embodiment of a street node.

FIG. 12A is a block diagram of an embodiment of a local wireless relay device 1200 as may be used as a "street node" in, for example, the monitoring system of FIG. 13. In FIG. 12A, the local wireless device 1200 comprises a wireless communication unit 1210 which is responsible for communicating with both monitoring devices (e.g., 1305 in FIG. 13) and other street or mesh nodes. The wireless communication unit 1210 may utilize any suitable wireless protocol and, in certain embodiments, may be embodied as multiple radio units if different wireless protocols are used by the different nodes in the mesh network 1320. If embodied as a single RF radio, the wireless communication unit 1210 may communicate with a monitoring device 1305 during one time window and other mesh nodes in another time window. The wireless communication unit 1210 is connected to an antenna 1206, and operates under control of a processor 1212 (which may comprise, e.g., a microprocessor, microcomputer, or digital circuitry) for controlling the basic functions of the local wireless relay device 1200. The processor 1212 preferably has access to a local memory 1214, which may, e.g., store programming instructions for execution by the processor 1212, operational parameters, and data being relayed over the mesh network 1320. The local memory 1214 may be used for storing a mesh link table 1235 which ranks local signals from other nodes according to any available metrics such as strength (e.g., received signal strength indication (RSSI)), signal-to-noise level, error level, and/or quality. The rankings in the mesh link table 1235 may be used by the local wireless relay device 1200 to select the primary route, secondary route, and so on, as previously described. The processor 1212 may also may have access to various clocks and/or timers 1217 for carrying out timing of certain events (e.g., timing of intervals between data transmissions). The local wireless relay device 1200 includes an external power supply input block 1222 connected to an external power source, such as a power socket on a utility pole or streetlamp. The local wireless relay device 1200 may have a battery backup and, in certain embodiments, rely upon battery, solar, or other power sources.

Figure 12B:
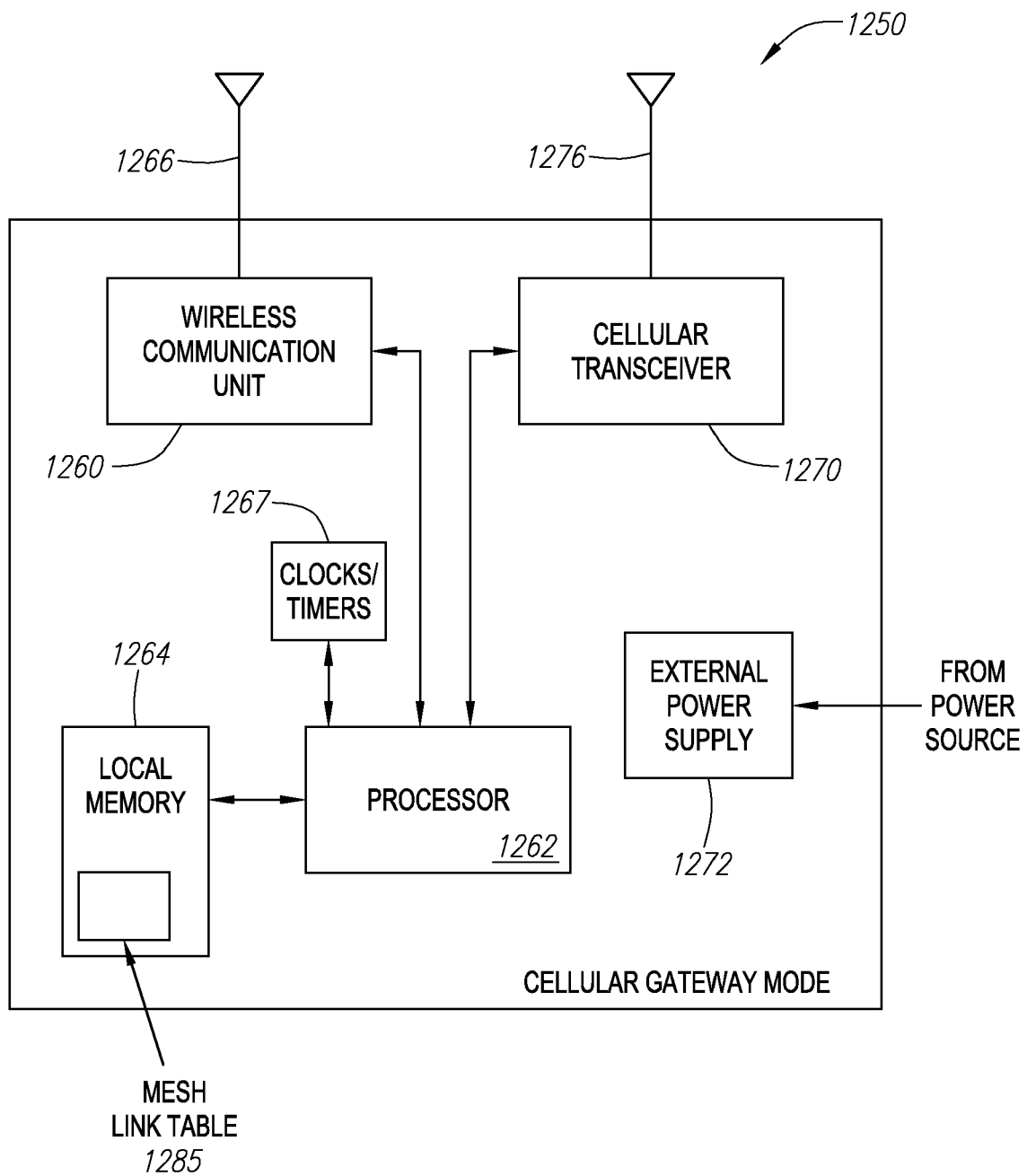
FIG. 12B is a block diagram of an embodiment of a bridge node, such as a cellular gateway node (or sky node).

FIG. 12B is a block diagram of an embodiment of a cellular gateway node 1250 as may be used as a "sky node" in, for example, the monitoring system of FIG. 13. The cellular gateway node 1250 in FIG. 12B is similar in many basic respects to the local wireless relay device 1200, and comprises, for example, a processor 1262, a local memory 1264 (including a mesh link table 1285), various clocks and/or timers 1267, and an external power supply input block 1272, all serving generally the same purpose as the corresponding components in the local wireless relay device. Because the cellular gateway node 1250 interfaces with a second wireless (e.g., cellular) network 1350, the processor 1262 also manages the interactions with that network as well as the nodes of the mesh network 1320. Preferably, the cellular gateway node 1250 includes a wireless communication unit 1260 and antenna 1266 that are similar to the corresponding components of the local wireless relay unit 1200, for communicating within the mesh network 1320, as well as a second wireless unit 1270, such as a cellular transceiver, for communicating over the second wireless (e.g., cellular) network 1350. Using this configuration, the cellular gateway node 1250 may communicate simultaneously within the mesh network 1320 and over the cellular network 1350. The cellular gateway node 1250 may convert data received from the mesh network 1320 into a different format, such as TCP/IP format, used for backhaul transport to the remote monitoring station 1370.

In any of the embodiments described herein, a monitoring device or other device may use multiple (e.g., four) batteries in connection with a switching methodology to extend battery power. The battery control system for the monitoring devices, or end nodes, may periodically rotate the batteries so that only one of the multiple batteries is active at a time (or more if multiple batteries are needed for regular operation) or as each battery drains to below a critical level. To accomplish this, the monitoring device may include circuitry for periodically measuring the remaining battery voltage and for conveying this information to the device processor or controller, and circuitry for switching power supply connections from one battery to another. The effective battery life for the monitoring device becomes the cumulative battery life for each battery (or set of batteries), and the longevity of the monitoring device may thus be significantly increased before battery replacement is required.

In any of the monitoring systems described herein, a particular type of monitoring device may be used exclusively, or else a combination of different monitoring devices may be used. For example, an in-hole monitoring device (such as illustrated, e.g., in FIG. 6A) may be used in locations where a sufficiently clear communication channel is available, and a surface-accessible monitoring device (such as illustrated, e.g., in FIG. 7) may be used in locations where it is difficult to obtain a sufficiently clear communication channel using an in-hole monitoring device. Similarly, monitoring devices connected to the monitoring station by landlines may be used in combination with wireless monitoring devices, in connection with an integrated monitoring system having both wired and wireless monitoring devices.

With any of the monitoring devices described herein, a selection of different types of wireless communication may be provided. According to one technique, for example, the specific wireless circuitry is selected at the time of installation. Field workers may test a number of different types of wireless equipment at an installation site, and select the one with optimal reception (e.g., signal strength). The monitoring device may be configured such that a small module (e.g., circuit board, electronic chip, or other type of module) containing the appropriate wireless circuitry may be inserted into the monitoring device prior to installation. Different monitoring devices may therefore utilize different types of wireless communications, and different wireless providers, to communicate with the remote monitoring station. According to an alternative technique, several different types of wireless circuitry are included in the same monitoring device, and a switch provided on the monitoring device is used to select which type of wireless circuitry to utilize.

While various components are described in certain embodiments as being "connected" to one another, it should be understood that such language encompasses any type of communication or transference of data, whether or not the components are actually physically connected to one another, or else whether intervening elements are present. It will be understood that various additional circuit or system components may be added without departing from teachings provided herein.

Implementation of one or more embodiments as disclosed herein may lead to various benefits and advantages. For example, a monitoring system in accordance with certain embodiments as disclosed herein may provide sanitary wastewater system owners and/or operators with an early warning of possible overflow conditions at specifically monitored manhole or other locations, thus allowing the owner/ operators sufficient time to prevent actual overflow by cleaning, servicing, shutoff, or other measures. Overflow prevention reduces the risk of costly cleanup operations, health hazards and environmental damage, interruption in service, and penalties from regulatory authorities or agencies. Other potential benefits of various monitoring systems as disclosed herein include reduction of routine preventative pipe cleaning and its associated costs, sewer system historical data for growth planning, and gross rainwater infiltration measurements.

While various systems and devices disclosed herein have most often been described in the particular context of monitoring, it will be understood that the techniques and principles disclosed may be applicable or adapted to other situations wherein it may be necessary or desirable to monitor the level of water, liquid, or any other time of substance that can accumulate over time. For example, monitoring systems as disclosed herein may be applicable to measuring and monitoring any type of water body (such as rivers, lakes, or coastal waters), or any type of liquid in an open pipe setting, or any other type of measurable matter (e.g., sand, ore, silt, mud, etc.) that accumulates.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A remote sensing system comprising:
   a housing adapted for being secured to and supported by a manhole cover within a sewer manhole, the housing having communication ports for sensors, the sensors monitoring parameters in the vicinity of the housing beneath the manhole cover;

a microcontroller within the housing for communicating the parameters to a two-way wireless radio module through a digital connection;

a connector cable connected to the two-way wireless radio module which leads to an external antenna embedded in or atop the manhole cover for transmitting the parameters to a remote communication device; and a power means for providing power to the housing.

2. The system of claim 1 wherein the sensors include a ranging sensor.

3. The system of claim 1 wherein the parameters are environmental or process parameters.

4. The system of claim 1 wherein the remote communication device is a receiving device.

5. The system of claim 1 wherein the remote communication device includes a personal computer.

6. The system of claim 1 further comprising a central server for receiving the parameters transmitted from the external antenna, the central server in communication with a database that stores the parameters.

7. The system of claim 1 wherein the housing includes an enclosure cover and a window.

8. The system of claim 1, wherein the sensors include one or more of a level sensor, a flow sensor, a pressure sensor, a ranging sensor, an ultrasonic ranging sensor, a gas sensor, and an optical monitor.

9. A remote sensing system, comprising:

a housing adapted for being secured to a manhole cover within a sewer manhole, the housing having communication ports for sensors, the sensors monitoring parameters in the vicinity of the housing beneath the manhole cover;

a microcontroller within the housing for communicating the parameters to a two-way wireless radio module through a digital connection;

a connector cable connected to the two-way wireless radio module which leads to an external antenna embedded in or atop the manhole cover for transmitting the parameters to a remote communication device;

a power means for providing power to the housing; and a second antenna connected to the housing for communicating with the central server using a different communication protocol than is used by the two-way wireless radio module communicating via the first antenna;

wherein the housing includes an enclosure cover and a window.

10. A remote sensing system comprising:

a housing attached to and supported by the underside of a manhole cover, the housing having communication ports for sensors, the sensors monitoring parameters in the vicinity of the housing and beneath the manhole cover;

a microcontroller within the housing for communicating the parameters to a two-way wireless radio module through a digital connection;

a connector cable connected to the two-way wireless radio module which leads to an external antenna embedded in or atop the manhole cover for transmitting the parameters to a remote communication device to a real-time receiver;

remotely programmable sensor thresholds which cause the microcontroller to communicate with the remote communication device when the sensor thresholds have been exceeded, said programmable sensor thresholds configured to be modified through commands received via the two-way wireless radio module; and a battery for providing power to the housing.

11. The system of claim 10, wherein the sensors monitor if the manhole cover has been moved and if the manhole cover has been moved, an alarm is triggered to notify the remote communication device.

12. The system of claim 11 further comprising one or more output ports on the microcontroller to control output devices.

13. The system of claim 11 further comprising an ultrasonic ranging detector for measuring the height of the water in the manhole.

14. The system of claim 13, wherein if the ultrasonic ranging detector detects the height of the water in the manhole to be above a predetermined level, an alert is sent to the remote communication device.

15. The system of claim 14, wherein the predetermined level is set in the microcontroller.

16. The system of claim 10, wherein the microcontroller is programmed via remote commands received by the two-way wireless radio module.

17. The system of claim 16, wherein the remote commands cause the microcontroller to change reporting frequency, change sampling frequency, or send sensor data to the remote communication device.

18. A remote sensing device comprising:

a housing adapted for being securably mounted beneath and supported by a manhole cover of a sewer manhole;

one or more sensors disposed within or coupled to said housing for monitoring conditions beneath the manhole cover, the conditions including at least a surface depth beneath the manhole cover;

a two-way wireless radio;

a digital processor within the housing for periodically communicating parameters associated with the monitored conditions to the two-way wireless radio;

an external antenna embedded in or atop the manhole cover, and magnetically or electronically coupled to the two-way wireless radio, for transmitting the parameters to a remote station; and a battery for providing power to the components within the housing.

19. The remote sensing device of claim 18, wherein the digital processor is programmable via remote commands received by the two-way wireless radio.

20. The remote sensing device of claim 19, wherein the remote commands cause the digital processor to change reporting frequency, change sampling frequency, or send sensor data to the remote communication device.

21. The remote sensing device of claim 18, further comprising a flow sensor and a toxic gas sensor.

* * * * *